United States Patent
Jung et al.

(10) Patent No.: US 11,096,211 B2
(45) Date of Patent: Aug. 17, 2021

(54) METHOD AND APPARATUS FOR COMMUNICATING USER DATA VIA A PHYSICAL SHARED CHANNEL

(71) Applicant: Lenovo (Singapore) Pte. Ltd., New Tech Park (SG)

(72) Inventors: Hyejung Jung, Northbrook, IL (US); Vijay Nangia, Woodridge, IL (US); Ravi Kuchibhotla, Clarendon Hills, IL (US); Hossein Bagheri, Urbana, IL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 26 days.

(21) Appl. No.: 16/584,681

(22) Filed: Sep. 26, 2019

(65) Prior Publication Data
US 2020/0107353 A1 Apr. 2, 2020

Related U.S. Application Data

(60) Provisional application No. 62/738,872, filed on Sep. 28, 2018.

(51) Int. Cl.
*H04L 1/00* (2006.01)
*H04W 72/12* (2009.01)
(Continued)

(52) U.S. Cl.
CPC ....... *H04W 72/1289* (2013.01); *H04W 24/08* (2013.01); *H04W 72/042* (2013.01); *H04W 80/02* (2013.01)

(58) Field of Classification Search
CPC ............. H04W 72/1289; H04W 24/08; H04W 72/042; H04W 80/02; H04W 72/1268;
(Continued)

(56) References Cited

U.S. PATENT DOCUMENTS

| 9,432,986 | B2 * | 8/2016 | Yang | ............... H04L 5/0092 |
| 2018/0331693 | A1 * | 11/2018 | Lou | ............... H04L 1/0061 |
| 2020/0036480 | A1 * | 1/2020 | Yang | ............... H04L 1/0073 |

FOREIGN PATENT DOCUMENTS

| EP | 2728787 A2 | 5/2014 |
| EP | 2911327 A1 | 8/2015 |
| WO | 2018141246 A1 | 8/2018 |

OTHER PUBLICATIONS

Fouasnon, PCT International Search Report, International Application No. PCT/IB2019/058206, European Patent Office, Rijswijk, NL, dated Feb. 6, 2020.

* cited by examiner

*Primary Examiner* — Lan-Huong Truong
(74) *Attorney, Agent, or Firm* — Loppnow & Chapa; Matthew C. Loppnow

(57) ABSTRACT

Information of a PDCCH search space can be received. The PDCCH search space can be associated with a DCI format. DCI of the DCI format can dynamically indicate a transmission mode of a plurality of transmission modes. The plurality of transmission modes can include at least transmission of multiple associated physical shared channels and non-coherent joint transmission in a physical shared channel. A downlink signal can be received at a monitoring occasion of the PDCCH search space. A PDCCH candidate can be decoded according to the DCI format by using the received downlink signal. A transmission mode can be determined from the decoded PDCCH candidate. User data can be communicated via at least one physical shared channel according to the determined transmission mode.

20 Claims, 4 Drawing Sheets

(51) Int. Cl.
*H04W 24/08* (2009.01)
*H04W 72/04* (2009.01)
*H04W 80/02* (2009.01)

(58) Field of Classification Search
CPC ............. H04W 72/1273; H04W 72/04; H04W 72/1215; H04W 72/1284; H04L 1/1896; H04L 1/0038; H04L 5/0094; H04L 1/1854; H04L 5/0053; H04L 1/1861; H04L 1/1864; H04L 5/0055; H04B 7/0689; H04B 7/024
See application file for complete search history.

METHOD AND APPARATUS FOR COMMUNICATING USER DATA VIA A PHYSICAL SHARED CHANNEL

BACKGROUND

1. Field

The present disclosure is directed to a method and apparatus for communicating user data via a physical shared channel. More particularly, the present disclosure is directed to communicating user data via a physical shared channel according to a determined transmission mode.

2. Introduction

Presently, wireless communication devices, such as User Equipment (UE), communicate with other communication devices using wireless signals. In Third Generation Partnership Project (3GPP) Release 15 (Rel-15) New Radio (NR), basic support for Ultra-Reliable and Low-Latency Communication (URLLC) was introduced with Transmission Time Interval (TTI) structures for low latency as well as methods for improved reliability. Further, the Rel-15 NR includes various Multiple Input Multiple Output (MIMO) features that facilitate utilization of a large number of antenna elements at a network entity, such as a gNodeB, a Transmission Reception Point (TRP), or other network entity and/or at a UE, taking into account deployment scenarios of multi-panel arrays and hybrid analog-digital beamforming for high frequency bands, such as over-6 GHz frequency bands. However, the Rel-15 NR MIMO only accommodates standard-transparent, limited multi-TRP, and/or multi-panel operation and provides basic support of beam management and beam failure recovery.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope. The drawings may have been simplified for clarity and are not necessarily drawn to scale.

DETAILED DESCRIPTION

Embodiments provide a method and apparatus for communicating user data via a physical shared channel according to a determined transmission mode. At least some embodiments can provide methods to enhance communication reliability with MIMO. According to a possible embodiment, information of a Physical Downlink Control Channel (PDCCH) search space can be received. The PDCCH search space can be associated with a Downlink Control Information (DCI) format. DCI of the DCI format can dynamically indicate a transmission mode of a plurality of transmission modes. The plurality of transmission modes can include transmission of multiple associated physical shared channels, non-coherent joint transmission in a physical shared channel, and/or other transmission modes. A downlink signal can be received at a monitoring occasion of the PDCCH search space. A PDCCH candidate can be decoded according to the DCI format by using the received downlink signal. A transmission mode can be determined from the decoded PDCCH candidate. User data can be communicated via at least one physical shared channel according to the determined transmission mode.

Figure 1:
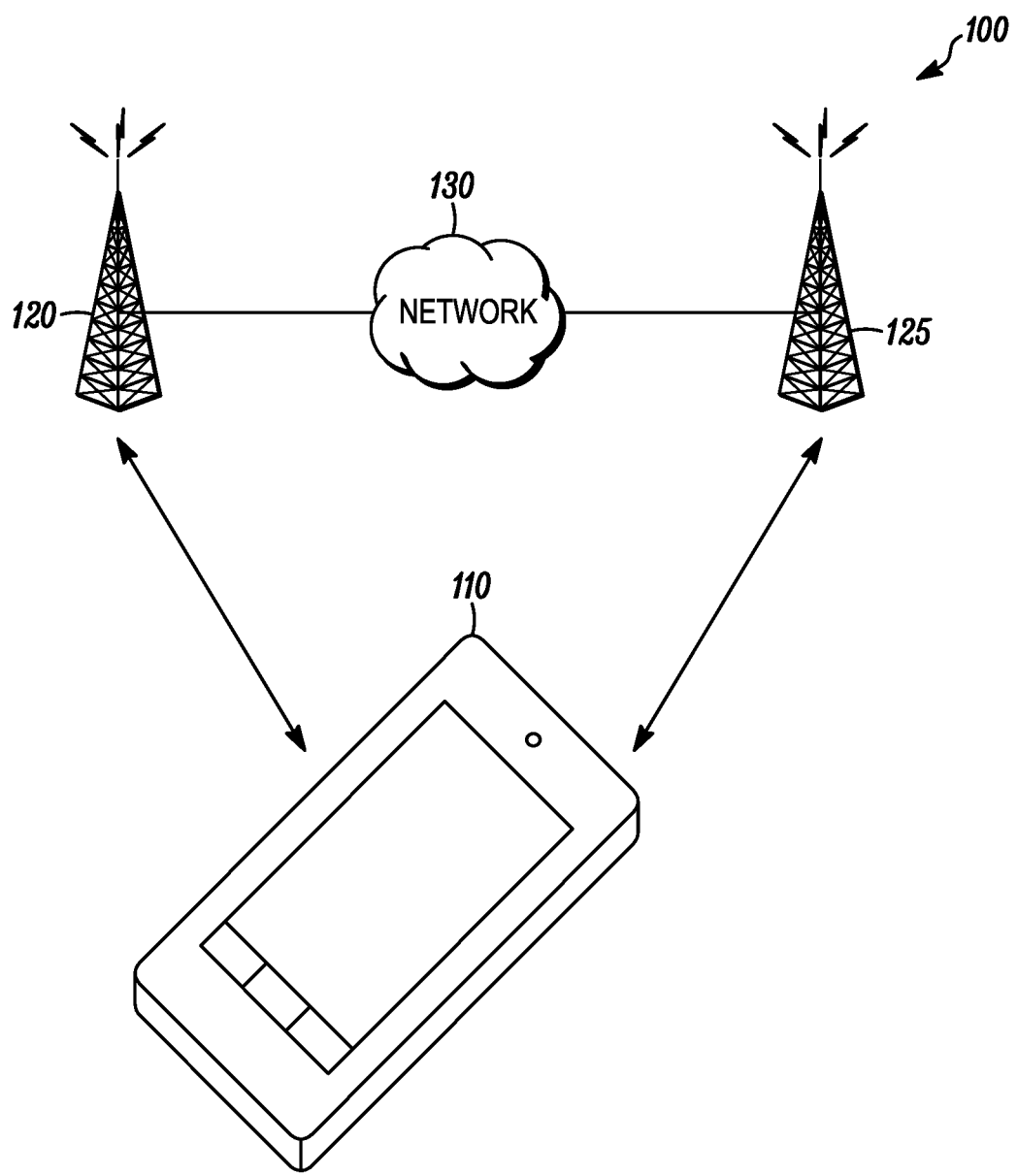
FIG. 1 is an example block diagram of a system according to a possible embodiment.

FIG. 1 is an example block diagram of a system 100 according to a possible embodiment. The system 100 can include a UE 110, at least one network entity 120 and 125, and a network 130. The UE 110 can be a wireless wide area network device, a user device, a wireless terminal, a portable wireless communication device, a smartphone, a cellular telephone, a flip phone, a personal digital assistant, a smartwatch, a tablet computer, a laptop computer, a personal computer, a selective call receiver, an Internet of Things (IoT) device, or any other user device that is capable of sending and receiving communication signals on a wireless network. The at least one network entity 120 and 125 can be a wireless wide area network base station, can be a NodeB, can be an enhanced NodeB (eNB), can be a New Radio NodeB (gNB), such as a 5G NodeB, can be an unlicensed network base station, can be an access point, can be a base station controller, can be a network controller, can be a TRP, can be a different type of network entity from the other network entity, and/or can be any other network entity that can provide wireless access between a UE and a network.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a NR network, a 3GPP-based network, a satellite communications network, a high altitude platform network, the Internet, and/or other communications networks.

In operation, the UE 110 can communicate with the network 130 via at least one network entity 120. For example, the UE can send and receive control signals on a control channel and user data signals on a data channel.

In Industrial Internet of Things (IIoT) applications, some factory environments may suffer from high blocking and/or penetration loss, e.g. due to heavy metal machines and special production settings, and deployment of multi-TRPs and support of low-latency, low-overhead, and robust beam management and recovery can be beneficial to overcome coverage holes and enhance communication reliability. At least some embodiments can provide for operation of the multi-TRPs support of low-latency, low-overhead, and robust beam management and recovery. At least some embodiments can also provide methods of enhanced Downlink Control Information (DCI) signaling for efficient support of non-coherent joint transmission of Physical Uplink Shared Channel (PUSCH) and uplink Transport Block (TB) duplication with multiple associated PUSCHs carrying a same TB.

To improve Downlink (DL) communication reliability, a UE can receive an indication of one or more associated search spaces, where one or more PDCCHs decoded in associated monitoring occasions of the one or more associated search spaces can schedule one or more PDSCHs carrying a same TB, respectively. While multiple PDSCHs carrying the same TB can increase the reliability for demodulation and decoding, an average DCI signaling overhead for successful delivery of one TB may increase due to multiple PDCCH transmissions for one TB in each Hybrid Automatic Repeat reQuest (HARD) (re)-transmission stage.

At least some embodiments can reduce DCI signaling overhead by transmitting scheduling information common to multiple associated PUSCHs (or PDSCHs) only in one PDCCH or in a number of PDCCHs that can be smaller than a number of associated PUSCHs (or PDSCHs) at each HARQ (re)-transmission stage. Furthermore, as the proposed DCI formats can support various transmission modes, such as TB duplication via multiple associated PUSCHs (or PDSCHs), non-coherent joint transmission of PUSCH (or PDSCHs), and PUSCH transmission to (or PDSCH reception from) a single TRP, a network entity can flexibly select different transmission modes without increasing the number of PDCCH blind decoding at a UE.

According to 3GPP TS 38.214, two transmission schemes, codebook-based transmission and non-codebook based transmission, are supported for PUSCH. For PUSCH transmission(s) dynamically scheduled by an Uplink (UL) grant in a DCI, a UE can, upon detection of a PDCCH with a configured DCI format 0_0 or 0_1, transmit the corresponding PUSCH as indicated by that DCI.

For PUSCH scheduled by DCI format 0_0 on a cell, the UE can transmit PUSCH according to the spatial relation, if applicable, corresponding to the Physical Uplink Control Channel (PUCCH) resource with the lowest ID within the active UL Bandwidth Part (BWP) of the cell, and the PUSCH transmission can be based on a single antenna port. A spatial setting for a PUCCH transmission can be provided by higher layer parameter PUCCH-SpatialRelationInfo if the UE is configured with a single value for higher layer parameter pucch-SpatialRelationInfoId; otherwise, if the UE is provided multiple values for higher layer parameter PUCCH-SpatialRelationInfo, the UE can determine a spatial setting for the PUCCH transmission based on a received PUCCH spatial relation activation/deactivation Medium Access Control (MAC) Control Element (CE), as described in 3GPP TS 38.321. The UE can apply a corresponding setting for a spatial domain filter to transmit PUCCH 3 msec after the slot where the UE transmits HARQ-ACK information with an ACK value corresponding to a PDSCH reception providing the PUCCH-SpatialRelationInfo.

For codebook-based transmission, PUSCH can be scheduled by DCI format 0_0 or DCI format 0_1. If PUSCH is scheduled by DCI format 0_1, the UE can determine its PUSCH transmission precoder based on Service Request Indicator (SRI), Transmitted Precoding Matrix Indicator (TPMI), and the transmission rank from the DCI, given by DCI fields of Sounding Reference Signal (SRS) resource indicator and precoding information and number of layers in subclause 7.3.1.1.2 of 3GPP TS 38.212. The TPMI can be used to indicate the precoder to be applied over the antenna ports $\{0 \ldots v-1\}$ and that corresponds to the SRS resource selected by the SRI, unless a single SRS resource is configured for a single SRS-ResourceSet set to 'codebook'. The transmission precoder can be selected from the uplink codebook that has a number of antenna ports equal to higher layer parameter nrofSRS-Ports in SRS-Config, as defined in Subclause 6.3.1.5 of 3GPP TS 38.211. When the UE is configured with the higher layer parameter txConfig set to 'codebook', the UE can be configured with at least one SRS resource. The indicated SRI in slot n can be associated with the most recent transmission of SRS resource identified by the SRI, where the SRS resource can be prior to the PDCCH carrying the SRI before slot n. The UE can determine its codebook subsets based on TPMI and upon the reception of higher layer parameter codebookSubset in PUSCH-Config, which can be configured with 'fullyAndPartialAndNonCoherent', or 'partialAndNonCoherent', or 'nonCoherent' depending on the UE capability. The maximum transmission rank can be configured by the higher parameter maxRank in PUSCH-Config.

For non-codebook-based transmission, PUSCH can be scheduled by DCI format 0_0 or DCI format 0_1. The UE can determine its PUSCH precoder and transmission rank based on the wideband SRI when multiple SRS resources are configured in a SRS resource set with higher layer parameter usage in SRS-ResourceSet set to 'nonCodebook', where the SRI can be given by the SRS resource indicator in DCI format 0_1 according to subclause 7.3.1.1.2 of 3GPP TS 38.212 and only one SRS port can be configured for each SRS resource. The indicated SRI in slot n can be associated with the most recent transmission of SRS resource(s) identified by the SRI, where the SRS transmission can be prior to the PDCCH carrying the SRI before slot n.

The UE can perform one-to-one mapping from the indicated SRI(s) to the indicated Demodulation Reference Signal (DMRS) ports(s) given by DCI format 0_1 in increasing order.

At least some embodiments can provide DCI scheduling multiple associated PUSCHs (or PDSCHs) or non-coherent joint transmission in a PUSCH (or PDSCH). For example, in each HARQ (re)-transmission stage, a UE can receive scheduling information of multiple associated PUSCH (or PDSCH) and can transmit the associated multiple PUSCHs (or receive the associated multiple PDSCHs), each of which can carry a same TB but can be potentially intended to (or coming from) different network nodes, e.g. TRPs, of a cell, in order to ensure reliable uplink (or downlink) TB delivery. In one example, the UE can be higher-layer configured with a number of associated PUSCHs (or PDSCHs) for a TB. In another example, the UE can be higher-layer configured with a maximum allowed number of associated PUSCHs (or PDSCHs) for a TB and can receive a dynamic indication of a number of associated PUSCHs (or PDSCHs) for a given TB as DCI in a PDCCH.

According to a possible embodiment, one PDCCH can schedule multiple associated PUSCHs (or PDSCHs) that carry a same TB with a same HARQ process number but with different time- and frequency-resource allocations. A network entity, such as a gNodeB, can transmit at least one UL grant for a UE's re-transmission of the TB, if the network entity was not able to correctly decode any PUSCH of the scheduled, associated multiple PUSCHs carrying the same TB. Similarly, the network entity can transmit a DL assignment(s) for re-transmission of the TB, if the network entity did not receive HARQ-ACK feedback indicating an acknowledgement (ACK) in any of PUCCH resources which are supposed to include HARQ-ACK feedback of the multiple associated PDSCHs. The network entity can indicate one PUCCH resource, for HARQ-ACK feedback corresponding to the multiple associated PDSCHs, that satisfies UE processing timeline requirements even for the last arriving PDSCH among the multiple associated PDSCHs. Alternatively, the network entity can indicate multiple PUCCH resources, each of which can be associated with each of the multiple associated PDSCHs, and the UE can transmit HARQ-ACK feedback on at least one indicated PUCCH resource.

According to a possible implementation, new DCI formats, for example, DCI format 0_0A and DCI format 0_1A (or DCI format 1_0A and DCI format 1_1A), that are different from Rel-15 NR DCI format 0_0 or DCI format 0_1 (or DCI format 1_0 and DCI format 1_1), can be defined for scheduling multiple associated PUSCHs (or PDSCHs) carrying a same TB. In one example, the new DCI formats to schedule multiple associated PUSCHs (or PDSCHs) can have multiple frequency domain resource assignment fields and multiple time domain resource assignment fields. In another example, the new DCI formats can have multiple frequency domain resource assignment fields but a single time domain resource assignment field. In yet another example, the new DCI formats can have a single frequency domain resource assignment field, but multiple time domain resource assignment fields. In other examples, the new DCI formats can have a fixed number larger than 1 of time domain resource assignment fields and frequency domain resource assignment fields corresponding to the higher-layer configured maximum supported number of associated PUSCHs or PDSCHs, and the actually used time domain- and frequency domain resource assignment fields can be determined based on the dynamically indicated number of associated PUSCHs or PDSCHs for a given TB. The remaining time domain- and frequency domain resource assignment fields can be reserved.

According to another possible implementation, the new DCI formats, e.g. DCI format 0_0A and DCI format 0_1A (or DCI format 1_0A and DCI format 1_1A), can be defined to support both non-coherent joint transmission in one PUSCH (or PDSCH) and scheduling of multiple associated PUSCHs (or PDSCHs). In one example of non-coherent joint uplink transmission, a UE can transmit multiple codewords, such as at least two codewords, in one PUSCH, where each subset of the multiple codewords can be independently beamformed or precoded, potentially transmitted with a different UE antenna panel, and potentially intended to a different network node, such as a TRP, or different antenna panel of a network node. In another example of non-coherent joint uplink transmission, the UE can transmit multiple spatial layers in one PUSCH, where each subset of the multiple spatial layers can be independently beamformed or precoded from other subsets of the multiple spatial layers, potentially transmitted with a different UE antenna panel, and potentially intended to a different network node or different antenna panel of a network node. Similarly, in non-coherent joint downlink transmission, the UE can receive multiple, such as at least two, codewords or multiple spatial layers in one PDSCH, where each subset of the multiple codewords or each subset of the multiple spatial layers can be independently beamformed or precoded, potentially transmitted from a different network node or different antenna panel of a network node, and potentially received with a different UE antenna panel.

In order to support a UE transmitting each of multiple associated PUSCHs or each codeword of non-coherent joint transmission of a PUSCH to different TRPs and/or different antenna panels of a network node, the new DCI formats for uplink grant, DCI format 0_0A and DCI format 0_1A, can include a modified SRS resource indicator field. The modified SRS resource indicator field can support indication of one or more SRS resources selected from an SRS resource set configured for PUSCH transmission (i.e. the SRS resource set with the higher layer parameter usage of value 'codeBook' or 'nonCodeBook') for both codebook based and non-codebook based PUSCH transmission. The maximum number of SRS resources indicated by the SRS resource indicator can be a UE capability. For codebook based PUSCH transmission and/or for DCI format 0_0A based PUSCH scheduling, each of associated PUSCHs or each codeword of non-coherent joint transmission of a PUSCH can be associated with one SRS resource. For non-codebook based PUSCH transmission and/or for DCI format 0_1A based PUSCH scheduling, each of associated PUSCHs carrying a same TB or each codeword of non-coherent joint transmission of a PUSCH can be associated with one or more SRS resources, where the one or more SRS resources can be associated with downlink reference signals of a same TRP or a same antenna panel of a network node. Also, or alternately, the one or more SRS resources can be intended to the same TRP or the same antenna panel of the network node, with a common set of power control configuration parameters, e.g. open-loop power control parameters such as P_o and alpha in TS 38.213 and a common set of closed-loop power control adjustment states.

According to a possible embodiment, more than one SRS resource set with the higher layer parameter usage of value 'codeBook' or 'nonCodeBook' can be configured at a UE for multiple associated PUSCHs or for non-coherent joint transmission in a PUSCH. Each SRS resource set with usage value codeBook' or 'nonCodeBook' can be used for scheduling each of associated PUSCHs carrying a same TB or each codeword of non-coherent joint transmission of a PUSCH. The maximum number of SRS resource sets can be a UE capability.

The modified SRS resource indicator can dynamically indicate the number of associated PUSCHs carrying a same TB (or the number of codewords of non-coherent joint transmission of a PUSCH), where the number can include one associated PUSCH (i.e. the number of associated PUSCHs can be one, i.e., no TB duplication at each HARQ (re)-transmission stage), which can mean no non-coherent joint transmission of a PUSCH and/or the modified SRS indicator can dynamically indicate the number of spatial layers for each of associated PUSCHs (or for each codeword of non-coherent joint transmission of a PUSCH) for non-codebook based transmission. For example, the SRS indicator can indicate the number of associated PUSCHs as one or more and can also indicate the number of spatial layers for each associated PUSCH for non-codebook-based transmission. As a further example, as shown in Table 7.3.1.1.2-29A through Table X below, one value of the SRS indicator can indicate two transmission occasions each with one spatial layer, another value can indicate two transmission occasions, one with one spatial layer and the other with two spatial layers, and other values can indicate other permutations.

In codebook based PUSCH transmission, DCI format 0_1A can include a set of 'precoding information and number of layers' fields, where each field can provide precoding information and can indicate the number of spatial layers for each of associated PUSCHs or for each codeword of non-coherent joint transmission of a PUSCH.

Considering that each of associated PUSCHs or each codeword of non-coherent joint transmission of a PUSCH is potentially intended to different TRPs and/or different antenna panels of a network node with a separate closed-loop power control adjustment state (and/or a separate Transmit Power Control (TPC) accumulation mode {enabled/disabled}), a set of TPC commands can be signaled in DCI format 0_0A and DCI format 0_1A, where each TPC command can be applicable to each of associated PUSCHs or each codeword of non-coherent joint transmission of a PUSCH. In another embodiment, the same TPC accumulation mode can be applied to all associated PUSCHs or all codewords of non-coherent joint transmission of a PUSCH.

In case that the number of associated PUSCHs carrying a same TB (or the number of codewords of non-coherent joint transmission of a PUSCH) is dynamically indicated/determined, the payload sizes of DCI format 0_0A and DCI format 0_1A can be determined based on the maximum supported number of associated PUSCHs (or the maximum supported number of codewords of non-coherent joint transmission of a PUSCH). If the number of information bits in the DCI format 0_0A (or DCI format 0_1A) prior to padding is less than the determined payload size of the DCI format 0_0A (or DCI format 0_1A) monitored in a UE specific search space, zeros can be appended until the number of information bits equals the determined payload size. Alternatively, the number of associated PUSCHs carrying a same TB (or the number of codewords of non-coherent joint transmission of a PUSCH) can be indicated by a MAC CE command, a fixed number of bits can be allocated to the corresponding field in DCI, and the UE can interpret the codepoints of the DCI field according to the MAC CE command. For example, MAC CE command can indicate 2 and 4, and a one-bit field in DCI can indicate '2' or '4' as the number of associated PUSCHs carrying a same TB (or the number of codewords of non-coherent joint transmission of a PUSCH).

For example, DCI format 0_0A with Cyclic Redundancy Check (CRC) scrambled by Cell-Radio Network Temporary Identifier (C-RNTI), Configured Scheduling (CS)-RNTI, Modulation Coding Scheme (MCS)-C-RNTI, or newly defined X-RNTI (which can be used for the newly defined DCI formats carrying scheduling information of multiple associated PUSCHs and/or non-coherent joint transmission) to schedule multiple associated single-antenna port PUSCHs carrying a same TB or to schedule non-coherent joint uplink transmission with multiple codewords in a PUSCH (where each codeword is associated with a single spatial layer, i.e. a single antenna port) can be defined as follows:

DCI format 0_0A can include an identifier for DCI formats, which can be 1 bit. The value of this bit field can always be set to 0, which can indicate an UL DCI format.

DCI format 0_0A can include a Transmission mode, which can be 1 bit, where 0 can indicates non-coherent joint transmission for a PUSCH, and 1 can indicate multiple associated PUSCHs carrying a same TB. If DCI format 0_0A is used only for multiple associated PUSCHs or only for non-coherent joint transmission in a PUSCH, this field may not exist.

DCI format 0_0A can include a Modified SRS resource indicator, which can be $$\left\lceil \log_2\left( \sum_{k=1}^{\min\{A_{max},N_{SRS}\}} \binom{N_{SRS}}{k} \right) \right\rceil$$

bits or $$\left\lceil \log_2\left( \binom{N_{SRS}}{A} \right) \right\rceil$$

bits, where $N_{SRS}$ can be the number of configured SRS resources in the SRS resource set associated with the higher layer parameter usage of value 'codeBook' or 'nonCodeBook'. The Modified SRS resource indicator can also be $$\left\lceil \log_2\left( \sum_{k=1}^{\min\{A_{max},N_{SRS}\}} \binom{N_{SRS}}{k} \right) \right\rceil$$

bits indicating the selected SRS resources according to Tables 7.3.1.1.2-28/29/30/31 (replacing $L_{max}$ with $A_{max}$) of 3GPP TS 38.212 if the number of associated PUSCHs carrying a same TB or the number of codewords in a PUSCH for non-coherent joint transmission is dynamically indicated, where $A_{max}$ can be the (higher-layer configured or determined by MAC CE) supported maximum number of associated PUSCHs for a transport block or the (higher layer configured, determined by MAC CE, or predefined) supported maximum number of codewords in a PUSCH for non-coherent joint transmission. Some entries of Tables 7.3.1.1.2-28/29/30/31 of 3GPP TS 38.212 corresponding to indication of one SRS resource may not be valid for DCI format 0_0A, if associated PUSCHs carrying a same TB are supposed to be transmitted with at least two different directions. Alternatively, $$\left\lceil \log_2\left( \sum_{k=2}^{\min\{A_{max},N_{SRS}\}} \binom{N_{SRS}}{k} \right) \right\rceil$$

bits according to Tables 7.3.1.1.2-29A/30A/31A defined below, if associated PUSCHs carrying a same TB are transmitted with at least two different directions indicated by at least two different SRS resources. In other implementations, more than one SRS resource set (i.e. $A_{max}$ SRS resource sets) for multiple associated PUSCHs or for non-coherent joint transmission in a PUSCH can be configured with the higher layer parameter usage of value 'codeBook' or 'nonCodeBook', and the modified SRS resource indicator can be $$\sum_{j=1}^{A_{max}} \lceil \log_2(N_{j,SRS} + 1) \rceil$$

bits, where $N_{j,SRS}$ can be the number of configured SRS resources in the SRS resource set j with the higher layer parameter usage of value 'codeBook' or 'nonCodeBook'. In each SRS resource set, either one SRS resource or none of SRS resources of the SRS resource set can be selected, and a group of consecutive $\lceil \log_2(N_{j,SRS}+1) \rceil$ bits for the bit group j of the field, where bit grouping starts from the MSB (or LSB) of the field, can indicate a selected SRS resource index from $\{0, 1, \ldots, N_{j,SRS}-1\}$ or a state that none of SRS resources is selected from the SRS resource set j. Modified SRS resource indicator can also be $$\left\lceil \log_2\left( \binom{N_{SRS}}{A} \right) \right\rceil$$

bits according to Table-X defined below if the number of associated PUSCHs carrying a same transport block or the number of codewords in a PUSCH for non-coherent joint transmission is higher-layer configured or predefined, where A can be the number of associated PUSCHs for a transport block or the number of non-coherent joint transmission codewords in a PUSCH. In another implementation, more than one SRS resource sets (i.e. A SRS resource sets) for multiple associated PUSCHs or for non-coherent joint transmission in a PUSCH can be configured with the higher layer parameter usage of value 'codeBook' or 'nonCodeBook', and the modified SRS resource indicator can be $$\sum_{j=1}^{A} \lceil \log_2(N_{j,SRS}) \rceil$$

bits, where $N_{j,SRS}$ can be the number of configured SRS resources in the SRS resource set j with the higher layer parameter usage of value 'codeBook' or 'nonCodeBook'. In each SRS resource set, one SRS resource can be selected, and a group of consecutive $\lceil \log_2(N_{j,SRS}) \rceil$ bits for the bit group j of the field, where bit grouping starts from the MSB (or LSB) of the field, can indicate a selected SRS resource index from $\{0, 1, \ldots, N_{j,SRS}-1\}$.

According to a possible embodiment, if the number of associated PUSCHs carrying a same transport block or the number of codewords in a PUSCH for non-coherent joint transmission is higher-layer configured or predefined, UE can transmit one PUSCH of multiple associated PUSCHs or one codeword of non-coherent joint transmission of a PUSCH according to the spatial relation, if applicable, corresponding to a PUCCH resource with the lowest ID within an active UL BWP of a cell, and can transmit the other PUSCHs of multiple associated PUSCHs or the other codewords of non-coherent joint transmission of the PUSCH according to the modified SRS resource indicator. In this case, the modified SRS resource indicator can have $$\left\lceil \log_2\left( \binom{N_{SRS}}{A-1} \right) \right\rceil$$

bits. Alternatively, the modified SRS resource indicator can have $$\sum_{j=1}^{A-1} \lceil \log_2(N_{j,SRS}) \rceil$$

bits, if more than one SRS resource sets are configured with the higher layer parameter usage of value 'codeBook' or 'nonCodeBook'.

DCI format 0_0A can include a set of frequency domain resource assignments or frequency domain resource assignment, which can be $A \cdot \lceil \log_2(N_{RB}^{UL,BWP}(N_{RB}^{UL,BWP}+1)/2) \rceil$ bits or $\lceil \log_2(N_{RB}^{UL,BWP}(N_{RB}^{UL,BWP}+1)/2) \rceil$ bits for a single frequency domain resource assignment for multiple associated PUSCHs or for non-coherent joint transmission in a PUSCH. A can be the number of associated PUSCHs for a transport block. A UE can determine the value of parameter A from the modified SRS resource indicator field, if dynamically indicated. Otherwise, the value of parameter A can be higher-layer configured, determined by MAC CE, or predefined. $N_{RB}^{UL,BWP}$ can be the size of the active UL bandwidth part in case DCI format 0_0 is monitored in the UE specific search space and satisfying: the total number of different DCI sizes configured to monitor is no more than 4 for the cell and the total number of different DCI sizes with C-RNTI configured to monitor is no more than 3 for the cell. Otherwise, $N_{RB}^{UL,BWP}$ can be the size of the initial UL bandwidth part.

For PUSCH hopping with resource allocation type 1, $N_{UL\_hop}$ MSB bits can be used to indicate the frequency offset according to Subclause 6.3 of TS 38.214, where $N_{UL\_hop}=1$ if the higher layer parameter frequencyHoppingOffsetLists contains two offset values and $N_{UL\_hop}=2$ if the higher layer parameter frequencyHoppingOffsetLists contains four offset values. $\lceil \log_2(N_{RB}^{UL,BWP}(N_{RB}^{UL,BWP}+1)/2) \rceil - N_{UL\_hop}$ bits can provide the frequency domain resource allocation according to Subclause 6.1.2.2.2 of TS 38.214. For non-PUSCH hopping with resource allocation type 1, $\lceil \log_2(N_{RB}^{UL,BWP}(N_{RB}^{UL,BWP}+1)/2) \rceil$ bits can provide the frequency domain resource allocation according to Subclause 6.1.2.2.2 of TS 38.214.

DCI format 0_0A can include a set of time domain resource assignments or time domain resource assignments, which can be 4·A bits or 4 bits for a single time domain resource assignment for multiple associated PUSCHs or for non-coherent joint transmission in a PUSCH. Each group of 4 consecutive bits can be defined in Subclause 6.1.2.1 of TS 38.214 where A can be the number of associated PUSCHs for a transport block. A UE can determine the value of parameter A from the modified SRS resource indicator field, if dynamically indicated. Otherwise, the value of parameter A can be higher-layer configured, determined by MAC CE, or predefined.

DCI format 0_0A can include a frequency hopping flag, which can be 1 bit according to Table 7.3.1.1.1-3, as defined in Subclause 6.3 of TS 38.214.

For transport block 1, DCI format 0_0A can include a modulation and coding scheme, which can be 5 bits as defined in Subclause 6.1.4.1 of TS 38.214. DCI format 0_0A can include a new data indicator, which can be 1 bit. DCI format 0_0A can include can include a redundancy version, which can be 2 bits as defined in Table 7.3.1.1.1-2 of TS 38.211.

For transport blocks 2, 3, . . . , and A (which may only be used for non-coherent joint transmission in a PUSCH, reserved or not present for other transmission modes of PUSCH), DCI format 0_0A can include a modulation and coding scheme, which can be 5·(A−1) bits as defined in Subclause 6.1.4.1 of TS 38.214. DCI format 0_0A can include new data indicator, which can be (A−1) bit. DCI format 0_0A can include a redundancy version, which can be 2·(A−1) bits, as defined in Table 7.3.1.1.1-2 of [TS 38.211], where A is the number of codewords of non-coherent joint transmission of a PUSCH.

DCI format 0_0A can include a HARQ process number, which can be 4 bits.

DCI format 0_0A can include a TPC command for scheduled PUSCH, which can be 2·A bits, with each 2 bits as defined in Subclause 7.1.1 of TS 38.213, where A can be the number of associated PUSCHs for a transport block or the number of codewords (equivalently, transport blocks) for non-coherent joint transmission.

DCI format 0_0A can include padding bits, if required.

DCI format 0_0A can include an UL/SUL indicator, which can be 1 bit for UEs configured with Supplementary Uplink (SUL) in the cell as defined in Table 7.3.1.1.1-1 of TS 38.212 and the number of bits for DCI format 1_0 before padding can be larger than the number of bits for DCI format 0_0 before padding; 0 bit otherwise. The UL/SUL indicator, if present, can be located in the last bit position of DCI format 0_0, after the padding bit(s). If the UL/SUL indicator is present in DCI format 0_0 and the higher layer parameter pusch-Config is not configured on both UL and SUL the UE can ignore the UL/SUL indicator field in DCI format 0_0, and the corresponding PUSCH scheduled by the DCI format 0_0 can be for the UL or SUL for which high layer parameter pucch-Config is configured. If the UL/SUL indicator is not present in DCI format 0_0, the corresponding PUSCH scheduled by the DCI format 0_0 can be for the UL or SUL for which high layer parameter pucch-Config can be configured.

TABLE 7.3.1.1.2-29A

Modified SRI indication for multiple associated PUSCHs or non-coherent joint transmission in a PUSCH, $A_{max} = 2$

| Bit field mapped to index | SRI(s), $N_{SRS} = 3$ | Bit field mapped to index | SRI(s), $N_{SRS} = 4$ |
|---|---|---|---|
| 0 | 0, 1 | 0 | 0, 1 |
| 1 | 0, 2 | 1 | 0, 2 |
| 2 | 1, 2 | 2 | 0, 3 |
| 3 | Reserved | 3 | 1, 2 |
|  |  | 4 | 1, 3 |
|  |  | 5 | 2, 3 |
|  |  | 6-7 | Reserved |

TABLE 7.3.1.1.2-30A

Modified SRI indication for multiple associated PUSCHs or non-coherent joint transmission in a PUSCH, $A_{max} = 3$

| Bit field mapped to index | SRI(s), $N_{SRS} = 3$ | Bit field mapped to index | SRI(s), $N_{SRS} = 4$ |
|---|---|---|---|
| 0 | 0, 1 | 0 | 0, 1 |
| 1 | 0, 2 | 1 | 0, 2 |
| 2 | 1, 2 | 2 | 0, 3 |
| 3 | 0, 1, 2 | 3 | 1, 2 |
|  |  | 4 | 1, 3 |
|  |  | 5 | 2, 3 |
|  |  | 6 | 0, 1, 2 |
|  |  | 7 | 0, 1, 3 |
|  |  | 8 | 0, 2, 3 |
|  |  | 9 | 1, 2, 3 |
|  |  | 10-15 | reserved |

TABLE 7.3.1.1.2-31A

Modified SRI indication for multiple associated PUSCHs or non-coherent joint transmission in a PUSCH, $A_{max} = 4$

| Bit field mapped to index | SRI(s), $N_{SRS} = 3$ | Bit field mapped to index | SRI(s), $N_{SRS} = 4$ |
|---|---|---|---|
| 0 | 0, 1 | 0 | 0, 1 |
| 1 | 0, 2 | 1 | 0, 2 |
| 2 | 1, 2 | 2 | 0, 3 |
| 3 | 0, 1, 2 | 3 | 1, 2 |
|  |  | 4 | 1, 3 |
|  |  | 5 | 2, 3 |
|  |  | 6 | 0, 1, 2 |
|  |  | 7 | 0, 1, 3 |
|  |  | 8 | 0, 2, 3 |
|  |  | 9 | 1, 2, 3 |
|  |  | 10 | 0, 1, 2, 3 |
|  |  | 11-15 | Reserved |

TABLE X

Modified SRI indication for multiple associated PUSCHs or non-coherent joint transmission in a PUSCH (the parameter A is higher-layer configured or predefined)

| Bit field mapped to index | SRI(s), $N_{SRS} = 3$, $A = 2$ | Bit field mapped to index | SRI(s), $N_{SRS} = 4$, $A = 2$ | Bit field mapped to index | SRI(s), $N_{SRS} = 4$, $A = 3$ |
|---|---|---|---|---|---|
| 0 | 0, 1 | 0 | 0, 1 | 0 | 0, 1, 2 |
| 1 | 0, 2 | 1 | 0, 2 | 1 | 0, 1, 3 |
| 2 | 1, 2 | 2 | 0, 3 | 2 | 0, 2, 3 |
| 3 | reserved | 3 | 1, 2 | 3 | 1, 2, 3 |
|  |  | 4 | 1, 3 |  |  |
|  |  | 5 | 2, 3 |  |  |
|  |  | 6-7 | Reserved |  |  |

In an example, DCI format 0_1A with CRC scrambled by C-RNTI, CS-RNTI, MCS-C-RNTI, or newly defined X-RNTI (which is used for the newly defined DCI formats carrying scheduling information of multiple associated PUSCHs and/or non-coherent joint transmission and/or is configured for a certain UE type/category and/or has a same or different size compared to other RNTIs such as C-RNTI, CS-RNTI, MCS-C-RNTI) to schedule multiple associated single or multiple-antenna port PUSCHs carrying a same TB or to schedule non-coherent joint uplink transmission with multiple codewords in a PUSCH (where each codeword is associated with a single or multiple spatial layer(s)) can be defined as follows:

DCI format 0_1A can include an identifier for DCI formats, which can be 1 bit. The value of this bit field can always be set to 0, indicating an UL DCI format.

DCI format 0_1A can include a transmission mode, which can be 1 bit. A value of 0 can indicate non-coherent joint transmission for a PUSCH, and a value of 1 can indicate multiple associated PUSCHs carrying a same TB. If DCI format 0_1A is used only for multiple associated PUSCHs or only for non-coherent joint transmission in a PUSCH, this field may not exist.

DCI format 0_1A can include a modified SRS resource indicator, which can be $$\left\lceil \log_2\left(\sum_{l=1}^{L_{max}} \sum_{k=1}^{K_l} \binom{N_{SRS}}{k \cdot l}\right) \right\rceil$$

bits, where $K_l$ can be the largest number satisfying $K_l \cdot l \leq \min\{l \cdot A_{max}, N_{SRS}\}$, or $$\left\lceil \log_2\left(\sum_{l=1}^{L} \binom{N_{SRS}}{l \cdot A}\right) \right\rceil$$

bits, where L can be the largest number satisfying $L \cdot A \leq \min\{A \cdot L_{max}, N_{SRS}\}$, where $N_{SRS}$ can be the number of configured SRS resources in the SRS resource set associated with the higher layer parameter usage of value 'codeBook' or 'nonCodeBook', $A_{max}$ can be the (higher-layer configured or determined by MAC CE) supported maximum number of associated PUSCHs for a transport block or the (higher layer configured, determined by MAC CE, or predefined) supported maximum number of codewords in a PUSCH for non-coherent joint transmission, and $L_{max}$ can be the supported maximum spatial layer per codeword (i.e. TB) for non-codebook based PUSCH and $L_{max}=1$ for codebook based PUSCH.

$$\left\lceil \log_2\left(\sum_{l=1}^{L_{max}}\sum_{k=1}^{K_l}\binom{N_{SRS}}{k \cdot l}\right)\right\rceil$$

The modified SRS resource indicator can also be bits indicating the number of spatial layers (equivalently, antenna ports) for each of multiple associated PUSCHs (or for each codeword of non-coherent joint transmission of a PUSCH) and the number of associated PUSCHs (or the number of codewords for non-coherent joint transmission of a PUSCH), if the number of associated PUSCHs carrying a same TB or the number of codewords in a PUSCH for non-coherent joint transmission is dynamically indicated. Alternatively, $$\left\lceil \log_2\left(\sum_{l=1}^{L_{max}}\sum_{k=2}^{K_l}\binom{N_{SRS}}{k \cdot l}\right)\right\rceil$$

bits, if associated PUSCHs carrying a same TB are transmitted with at least two different directions indicated by at least two different SRS resources. In other implementations, more than one SRS resource set (i.e. $A_{max}$ SRS resource sets) for multiple associated PUSCHs or for non-coherent joint transmission in a PUSCH can be configured with the higher layer parameter usage of value 'codeBook' or 'nonCodeBook', and the modified SRS resource indicator can include $$\sum_{j=1}^{A_{max}}\left\lceil \log_2\left(1+\sum_{k=1}^{min\{L_{max},N_{j,SRS}\}}\binom{N_{j,SRS}}{k}\right)\right\rceil$$

bits, where $N_{j,SRS}$ can be the number of configured SRS resources in the SRS resource set j with the higher layer parameter usage of value 'codeBook' or 'nonCodeBook'. In each SRS resource set, either one or more SRS resources or none of SRS resources of the SRS resource set can be selected, and a group of consecutive $$\left\lceil \log_2\left(1+\sum_{k=1}^{min\{L_{max},N_{j,SRS}\}}\binom{N_{j,SRS}}{k}\right)\right\rceil$$

bits for the bit group j of the field, where bit grouping starts from the MSB (or LSB) of the field, can indicate selected one or more SRS resource indices from $\{0, 1, \ldots, N_{j,SRS}-1\}$ or a state that none of SRS resources is selected from the SRS resource set j.

The modified SRS resource indicator can also be $$\left\lceil \log_2\left(\sum_{l=1}^{L}\binom{N_{SRS}}{l \cdot A}\right)\right\rceil$$

bits if the number of associated PUSCHs carrying a same transport block or the number of codewords in a PUSCH for non-coherent joint transmission is higher-layer configured or predefined, where A can be the number of associated PUSCHs for a transport block or the number of non-coherent joint transmission codewords in a PUSCH. In another implementation, more than one SRS resource set (i.e. A SRS resource sets) for multiple associated PUSCHs or for non-coherent joint transmission in a PUSCH can be configured with the higher layer parameter usage of value 'codeBook' or 'nonCodeBook', and the modified SRS resource indicator can include $$\sum_{j=1}^{A}\left\lceil \log_2\left(\sum_{k=1}^{min\{L_{max},N_{j,SRS}\}}\binom{N_{j,SRS}}{k}\right)\right\rceil$$

bits, where $N_{j,SRS}$ can be the number of configured SRS resources in the SRS resource set j with the higher layer parameter usage of value 'codeBook' or 'nonCodeBook'. In each SRS resource set, one or more SRS resources can be selected, and a group of consecutive $$\left\lceil \log_2\left(\sum_{k=1}^{min\{L_{max},N_{j,SRS}\}}\binom{N_{j,SRS}}{k}\right)\right\rceil$$

bits for the bit group j of the field, where bit grouping starts from the MSB (or LSB) of the field, can indicate selected one or more SRS resource indices from $\{0, 1, \ldots, N_{j,SRS}-1\}$.

DCI format 0_1A can include a carrier indicator, which can be 0 or 3 bits, as defined in Subclause 10.1 of TS 38.213.

DCI format 0_1A can include a UL/SUL indicator, which can be 0 bit for UEs not configured with SUL in the cell or UEs configured with SUL in the cell but only PUCCH carrier in the cell is configured for PUSCH transmission; 1 bit for UEs configured with SUL in the cell as defined in Table 7.3.1.1.1-1.

DCI format 0_1A can include a bandwidth part indicator, which can be 0, 1 or 2 bits as determined by the number of UL BWPs $n_{BWP,RRC}$ configured by higher layers, excluding the initial UL bandwidth part. The bitwidth for this field can be determined as $\lceil \log_2(n_{BWP})\rceil$ bits, where $n_{BWP}=n_{BWP,RRC}+1$ if $n_{BWP,RRC}\leq 3$ in which case the bandwidth part indicator can be equivalent to the higher layer parameter BWP-Id. Otherwise $n_{BWP}=n_{BWP,RRC}$, in which case the bandwidth part indicator can be defined in Table 7.3.1.1.2-1. If a UE does not support active BWP change via DCI, the UE can ignore this bit field.

DCI format 0_1A can include a set of frequency domain resource assignments or frequency domain resource assignments, which can be A·Y bits or Y bits for a single frequency domain resource assignment for multiple associated PUSCHs or for non-coherent joint transmission in a PUSCH, where A can be the number of associated PUSCHs for a transport block (UE can determine the value of parameter A from the modified SRS resource indicator field, if dynamically indicated. Otherwise, the value of parameter A can be higher-layer configured, determined by MAC CE, or predefined) and Y can be the number of bits for a single frequency domain resource assignment determined by the following, where $N_{RB}^{UL,BWP}$ is the size of the active UL bandwidth part. Y can be $N_{RBG}$ bits if only resource allocation type 0 is configured, where $N_{RBG}$ is defined in Subclause 6.1.2.2.1 of TS 38.214. Y can be $\lceil \log_2(N_{RB}^{UL,BWP}(N_{RB}^{UL,BWP}+1)/2) \rceil$ bits if only resource allocation type 1 is configured, or $\max(\lceil \log_2(N_{RB}^{UL,BWP}(N_{RB}^{UL,BWP}+1)/2) \rceil, N_{RBG})+1$ bits if both resource allocation type 0 and 1 are configured. If both resource allocation type 0 and 1 are configured, the MSB bit can be used to indicate resource allocation type 0 or resource allocation type 1, where the bit value of 0 can indicate resource allocation type 0 and the bit value of 1 indicates resource allocation type 1.

For resource allocation type 0, the $N_{RBG}$ LSBs can provide the resource allocation as defined in Subclause 6.1.2.2.1 of TS 38.214. For resource allocation type 1, the $\lceil \log_2(N_{RB}^{UL,BWP}(N_{RB}^{UL,BWP}+1)/2) \rceil$ LSBs can provide the resource allocation as follows: For PUSCH hopping with resource allocation type 1, $N_{UL\_hop}$ MSB bits can be used to indicate the frequency offset according to Subclause 6.3 of TS 38.214, where $N_{UL\_hop}=1$ if the higher layer parameter frequencyHoppingOffsetLists contains two offset values and $N_{UL\_hop}=2$ if the higher layer parameter frequencyHoppingOffsetLists contains four offset values; and $\lceil \log_2(N_{RB}^{UL,BWP}(N_{RB}^{UL,BWP}+1)/2) \rceil - N_{UL\_hop}$ bits can provide the frequency domain resource allocation according to Subclause 6.1.2.2.2 of TS 38.214. For non-PUSCH hopping with resource allocation type 1, $\lceil \log_2(N_{RB}^{UL,BWP}(N_{RB}^{UL,BWP}+1)/2) \rceil$ bits can provide the frequency domain resource allocation according to Subclause 6.1.2.2.2 of TS 38.214.

If "Bandwidth part indicator" field indicates a bandwidth part other than the active bandwidth part and if both resource allocation type 0 and 1 are configured for the indicated bandwidth part, the UE can assume resource allocation type 0 for the indicated bandwidth part if the bitwidth of the "Frequency domain resource assignment" field of the active bandwidth part is smaller than the bitwidth of the "Frequency domain resource assignment" field of the indicated bandwidth part.

DCI format 0_1A can include a set of time domain resource assignments or time domain resource assignments, which can be A·Z bits or Z bits for a single time domain resource assignment for multiple associated PUSCHs or for non-coherent joint transmission in a PUSCH, where A can be the number of associated PUSCHs for a transport block (UE can determine the value of parameter A from the modified SRS resource indicator field, if dynamically indicated. Otherwise, the value of parameter A can be higher-layer configured, determined by MAC CE, or predefined) and Z can be the number of bits for a single time domain resource assignment, 0, 1, 2, 3, or 4 bits as defined in Subclause 6.1.2.1 of TS38.214. The bitwidth for the parameter Z can be determined as $\lceil \log_2(I) \rceil$ bits, where I can be the number of entries in the higher layer parameter puschTimeDomainAllocationList.

DCI format 0_1A can include a frequency hopping flag, which can be 0 or 1 bit. The frequency hopping flag can be 0 bit if only resource allocation type 0 is configured or if the higher layer parameter frequencyHopping is not configured. The frequency hopping flag can be 1 bit according to Table 7.3.1.1.1-3 otherwise, it can be only applicable to resource allocation type 1, as defined in Subclause 6.3 of TS 38.214.

For transport block 1, DCI format 0_1A can include a modulation and coding scheme, which can be 5 bits as defined in Subclause 6.1.4.1 of TS 38.214; can include a new data indicator, which can be 1 bit; and can include a redundancy version, which can be 2 bits as defined in Table 7.3.1.1.1-2 of TS 38.212.

For transport blocks 2, 3, . . . , and A (only used for non-coherent joint transmission in a PUSCH, reserved or not present for other transmission modes of PUSCH), DCI format 0_1A can include a modulation and coding scheme, which can be 5·(A−1) bits as defined in Subclause 6.1.4.1 of TS 38.214; can include a new data indicator, which can be (A−1) bits; and can include a redundancy version, which can be 2·(A−1) bits as defined in Table 7.3.1.1.1-2 of TS 38.212.

DCI format 0_1A can include a HARQ process number, which can be 4 bits.

DCI format 0_1A can include $1^{st}$ downlink assignment index, which can be 1 or 2 bits. The $1^{st}$ downlink assignment index can be 1 bit for semi-static HARQ-ACK codebook. The $1^{st}$ downlink assignment index can be 2 bits for dynamic HARQ-ACK codebook.

DCI format 0_1A can include $2^{nd}$ downlink assignment index, which can be 0 or 2 bits. The $2^{nd}$ downlink assignment index can be 2 bits for dynamic HARQ-ACK codebook with two HARQ-ACK sub-codebooks. $2^{nd}$ downlink assignment index can be 0 bits otherwise.

DCI format 0_1A can include a set of TPC command for associated PUSCHs or non-coherent joint transmission PUSCH, which can be 2·A bits as defined in Subclause 7.1.1 of TS38.213, where A can be the number of associated PUSCHs for a transport block or the number of codewords (equivalently, transport blocks) for non-coherent joint transmission.

DCI format 0_1A can include a set of precoding information and number of layers, where the number of bits for each of associated PUSCHs or for each codeword of non-coherent joint transmission of a PUSCH, determined by the following: 0 bits if the higher layer parameter txConfig=nonCodeBook; 0 bits for 1 antenna port and if the higher layer parameter txConfig=codebook; 4, 5, or 6 bits according to Table 7.3.1.1.2-2 of TS 38.212 for 4 antenna ports, if txConfig=codebook, and according to whether transform precoder is enabled or disabled, and the values of higher layer parameters maxRank, and codebookSubset; 2, 4, or 5 bits according to Table 7.3.1.1.2-3 of TS 38.212 for 4 antenna ports, if txConfig=codebook, and according to whether transform precoder is enabled or disabled, and the values of higher layer parameters maxRank, and codebookSubset; 2 or 4 bits according to Table7.3.1.1.2-4 of TS 38.212 for 2 antenna ports, if txConfig=codebook, and according to whether transform precoder is enabled or disabled, and the values of higher layer parameters maxRank and codebookSubset; or 1 or 3 bits according to Table7.3.1.1.2-5 of TS 38.212 for 2 antenna ports, if txConfig=codebook, and according to whether transform precoder is enabled or disabled, and the values of higher layer parameters maxRank and codebookSubset.

DCI format 0_1A can include a set of antenna ports information, where the number of bits for each of associated PUSCHs or for each codeword of non-coherent joint transmission of a PUSCH, determined by the following: 2 bits as defined by Tables 7.3.1.1.2-6 of TS 38.212, if transform precoder is enabled, dmrs-Type=1, and maxLength=1; 4 bits as defined by Tables 7.3.1.1.2-7 of TS 38.212, if transform precoder is enabled, dmrs-Type=1, and maxLength=2; 3 bits as defined by Tables 7.3.1.1.2-8/9/10/11 of TS 38.212, if transform precoder is disabled, dmrs-Type=1, and maxLength=1, and the value of rank is determined according to the SRS resource indicator field if the higher layer parameter txConfig nonCodebook and according to the Precoding information and number of layers field if the higher layer parameter txConfig=codebook; 4 bits as defined by Tables 7.3.1.1.2-12/13/14/15 of TS 38.212, if transform precoder is disabled, dmrs-Type=1, and maxLength=2, and the value of rank is determined according to the SRS resource indicator field if the higher layer parameter txConfig nonCodebook and according to the Precoding information and number of layers field if the higher layer parameter txConfig codebook; 4 bits as defined by Tables 7.3.1.1.2-16/17/18/19 of TS 38.212, if transform precoder is disabled, dmrs-Type=2, and maxLength=1, and the value of rank is determined according to the SRS resource indicator field if the higher layer parameter txConfig=nonCodebook and according to the Precoding information and number of layers field if the higher layer parameter txConfig codebook; or 5 bits as defined by Tables 7.3.1.1.2-20/21/22/23 of TS 38.212, if transform precoder is disabled, dmrs-Type=2, and maxLength=2, and the value of rank is determined according to the SRS resource indicator field if the higher layer parameter txConfig nonCodebook and according to the Precoding information and number of layers field if the higher layer parameter txConfig codebook. The number of Code Division Multiplexing (CDM) groups without data of values 1, 2, and 3 in Tables 7.3.1.1.2-6 to 7.3.1.1.2-23 in TS 38.212 can refer to CDM groups {0}, {0, 1}, and {0, 1, 2} respectively. If a UE is configured with both dmrs-UplinkForPUSCH-MappingTypeA and dmrs-UplinkForPUSCH-MappingTypeB, the bitwidth of this field can equal max{$x_A$, $x_B$}, where $x_A$ can be the "Antenna ports" bitwidth derived according to dmrs-UplinkForPUSCH-MappingTypeA and $x_B$ can be the "Antenna ports" bitwidth derived according to dmrs-UplinkForPUSCH-MappingTypeB. A number of |$x_A$−$x_B$| zeros can be padded in the MSB of this field, if the mapping type of the PUSCH corresponds to the smaller value of $x_A$ and $x_B$.

DCI format 0_1A can include SRS request, which can be 2 bits as defined by Table 7.3.1.1.2-24 of TS 38.212 for UEs not configured with SUL in the cell; 3 bits for UEs configured SUL in the cell where the first bit can be the non-SUL/SUL indicator as defined in Table 7.3.1.1.1-1 and the second and third bits can be defined by Table 7.3.1.1.2-24. This bit field can also indicate the associated CSI-RS according to Subclause 6.1.1.2 of TS 38.214. With an increase of number of simultaneously operating UE antenna panels and/or TRP/gNB antenna panels, the bit width of this field can increase to accommodate a larger number of triggering scenarios of aperiodic SRS resource sets.

DCI format 0_1A can include a CSI request, which can be 0, 1, 2, 3, 4, 5, or 6 bits determined by higher layer parameter reportTriggerSize.

DCI format 0_1A can include Code Block Group (CBG) Transmission Information (CBGTI), which can be 0, 2, 4, 6, or 8 bits determined by higher layer parameter maxCodeBlockGroupsPerTransportBlock for PUSCH.

DCI format 0_1A can include Phase Tracking Reference Signal (PTRS)-DMRS association, where the number of bits determined as follows: 0 bit if PTRS-UplinkConfig is not configured and transform precoder is disabled, or if transform precoder is enabled, or if maxRank=1; or 2 bits otherwise, where Table 7.3.1.1.2-25 and 7.3.1.1.2-26 in TS 38.212 can be used to indicate the association between PTRS port(s) and DMRS port(s) for transmission of one PTRS port and two PTRS ports respectively, and the DMRS ports are indicated by the Antenna ports field. If "Bandwidth part indicator" field indicates a bandwidth part other than the active bandwidth part and the "PTRS-DMRS association" field is present for the indicated bandwidth part but not present for the active bandwidth part, the UE can assume the "PTRS-DMRS association" field may not be present for the indicated bandwidth part.

DCI format 0_1A can include a beta offset indicator, which can be 0 if the higher layer parameter betaOffsets=semiStatic; otherwise 2 bits as defined by Table 9.3-3 in TS 38.213.

DCI format 0_1A can include a DMRS sequence initialization, which can be 0 bit if the higher layer parameter transform precoder is enabled; or 1 bit if the higher layer parameter transform precoder is disabled.

DCI format 0_1A can include a UL-Shared Channel (SCH) indicator, which can be 1 bit. A value of "1" can indicate UL-SCH shall be transmitted on the PUSCH and a value of "0" can indicate UL-SCH shall not be transmitted on the PUSCH. A UE may not be expected to receive a DCI format 0_1 with UL-SCH indicator of "0" and CSI request of all zero(s).

Since the above examples of DCI format 0_0A and DCI format 0_1A can also be used to schedule PUSCH without non-coherent joint transmission or one PUSCH without UL TB duplication at each HARQ transmission stage, the UE can be configured to monitor either DCI format 0_0 or DCI format 0_0A and/or either DCI format 0_1 or DCI format 0_1A in a given UE-specific search space. In a common search space, the UE can be configured to monitor both DCI format 0_0 and DCI format 0_0A to receive common PDCCHs based on DCI format 0_0.

According to another possible embodiment, a UE can be configured with multiple values for the higher layer parameter PUCCH-SpatialRelationInfo of 3GPP TS 38.331, and can receive a PUCCH spatial relation activation/deactivation MAC CE command, which can activate one or more spatial settings for PUCCH transmission. For DCI format 0_0A, the modified SRS resource indicator field may not exist. Instead, the UE can identify the number of associated PUSCHs (or the number of codewords of non-coherent joint transmission of a PUSCH) and spatial settings of multiple associated PUSCHs (or spatial settings of multiple codewords of non-coherent joint transmission of the PUSCH) based on the number of activated spatial settings and corresponding activated spatial settings for PUCCH transmission.

At least some embodiments can provide for configured grant-based uplink transmission. For example, according to 3GPP TS 38.214, PUSCH transmission(s) can be semi-statically configured to operate according to Subclause 6.1.2.3 of TS 38.214 and according to Subclause 5.8.2 of TS 38.321 upon the reception of higher layer parameter of configuredGrantConfig including rrc-ConfiguredUplinkGrant without the detection of an UL grant in a DCI, or configurdGrantConfig not including rrc-ConfiguredUplinkGrant semi-persistently scheduled by an UL grant in a DCI after the reception of higher layer parameter configurdGrantConfig not including rrc-ConfiguredUplinkGrant.

For configured grant Type1A PUSCH transmission, where a UE transmits multiple associated PUSCHs carrying a same TB on semi-statically configured multiple time and frequency resources, the radio resource control (RRC) parameter rrc-ConfiguredUplinkGrant included in configuredGrantConfig can include the higher layer parameter timeDomainAllocation with one or more values and frequencyDomainAllocation with one or more values with one-to-one, one-to-many, or many-to-one mapping between values for timeDomainAllocation and values for frequencyDomainAllocation. The modulation and coding scheme index, $I_{MCS}$, can be provided by higher layer parameter mcsAndTBS. The number of DMRS CDM groups, DMRS ports, modified SRS resource indication, and DM-RS sequence initialization can be determined as in DCI format 0_1A described above, and the antenna port value, the bit value for DMRS sequence initialization, precoding information, modified SRS resource indicator can be provided by antennaPort, dmrs-SeqInitialization, precodingAndNumberOfLayers, and srs-ResourceIndicatorModified respectively. When frequency hopping is enabled, the frequency offset between two frequency hops can be configured by higher layer parameter frequencyHoppingOffset.

For configured grant Type 2A PUSCH transmissions, where a UE transmits multiple associated PUSCHs carrying a same TB on semi-persistently scheduled multiple time and frequency resources, the resource allocation can follow the higher layer configuration according to TS 38.321, and UL grant received on the DCI with DCI format 0_0A or DCI format 0_1A described above.

At least some embodiments can provide for transform precoding in PUSCH. For example, a UE can assume that transform precoding (i.e. Discrete Fourier Transform (DFT)-spreading before Orthogonal Frequency Division Multiplexing (OFDM) modulation) is disabled when receiving DCI scheduling multiple PUSCHs carrying the same TB or receiving DCI scheduling non-coherent joint transmission of a PUSCH. That is, even if the UE is higher-layer configured with 'transform precoding=enabled', the UE can ignore the RRC configuration for transform precoding in PUSCH, for non-coherent joint transmission of a PUSCH or for multiple associated PUSCHs. Transform precoding applied in uplink waveform, such as DFT-spread OFDM, can cause additional inter-symbol interference compared to OFDM waveform. It is likely that UE scheduled with non-coherent joint transmission is not transmit-power limited and inter-symbol interference caused by transform precoding may not be desirable for multi-layer and/or multi-codeword transmission. For multiple associated PUSCH transmissions to different TRPs, effective received signal power can be improved by combining multiple received signals of multiple reception points. Thus, transform precoding can be disabled for multiple associated PUSCHs.

According to a possible embodiment, the PDCCH scheduling PDSCH can include a Transmission Configuration Indicator (TCI) for determining PDSCH antenna port quasi co-location. The TCI can indicate one of the higher layer TCI-State configurations (down-selected by a MAC CE TCI state activation command) in the scheduled component carrier or DL BWP configuring a quasi-co-location relationship between one or more reference downlink reference signals and the DMRS ports of the PDSCH. The quasi co-location types can take one of the following values: 'QCL-TypeA': {Doppler shift, Doppler spread, average delay, delay spread}; 'QCL-TypeB': {Doppler shift, Doppler spread}; 'QCL-TypeC': {Doppler shift, average delay}; or 'QCL-TypeD': {Spatial Rx parameter}.

For a first PDSCH (e.g., in case of multiple associated PDSCH), or a first codeword or first set of layers (e.g., in case of non-coherent joint transmission in PDSCH), the DCI can indicate a first TCI state for PDSCH antenna port quasi co-location associated with the first PDSCH or a first codeword or first set of layers, and for a second PDSCH or a second codeword or second set of layers, the DCI can indicate a second TCI state for PDSCH antenna port quasi co-location associated with the second PDSCH or a second codeword or second set of layers. According to a possible implementation, the first TCI state and second TCI state can be jointly coded. According to a possible implementation, the UE can be configured with a first set of TCI states, and a second set of TCI states by higher layer signaling. The signaling can include reception of an activation command to map a subset of first set of TCI states, and second subset of TCI states to codepoints of the DCI field 'Transmission Configuration Indication'. The TCI codepoint in DCI thus can indicate two TCI states: a first TCI state from the first set of TCI states which indicates the PDSCH antenna port quasi co-location for a first PDSCH (e.g., in case of multiple associated PDSCH), or a first codeword or first set of layers (e.g., in case of non-coherent joint transmission in PDSCH), and a second TCI state from the second set of TCI states which can indicate the PDSCH antenna port quasi co-location for a second PDSCH (e.g., in case of multiple associated PDSCH), or a second codeword or second set of layers (e.g., in case of non-coherent joint transmission in PDSCH). The UE can be indicated a first antenna port group associated with the first PDSCH or a first codeword or first set of layers, and a second antenna port group associated with the second PDSCH or a second codeword or second set of layers. The UE can assume the same HARQ process number for the first PDSCH and second PDSCH. The UE can be indicated a first rate matching indicator associated with the first PDSCH or a first codeword or first set of layers, and a second rate matching indicator associated with the second PDSCH or a second codeword or second set of layers. The indicators can be separate fields in the DCI or jointly coded with a codepoint of the rate matching indicator indicating the tuple {first rate matching indication, second rate matching indication}. Similarly, a code point of antenna port indicator can indicate the tuple {first antenna port group, second antenna port group}.

At least some embodiments can provide for an enhanced beam failure recovery procedure. For example, in multi-beam based UE and network operation, if current serving beam(s)' quality of a UE improves while the UE is performing a Beam Failure Recovery (BFR) procedure (i.e. UE has transmitted at least one Physical Random Access Channel (PRACH) preamble for beam failure recovery request), it was not clear whether, how, and when the UE stops the on-going BFR procedure. If the UE did not stop BFR and if the RACH procedure for BFR fails (e.g. due to sudden link quality degradation of newly selected beams or due to preamble collision and/or failure of contention resolution), the UE went into Radio Link Failure (RLF) even though the current serving beam(s)' quality does not lead to RLF.

According to a possible embodiment, a UE can terminate an on-going beam failure recovery procedure with a MAC layer considering the Random Access procedure successfully completed and by a physical layer not re-transmitting a PRACH preamble, if one or more of the following conditions are met: the UE selects a contention-based PRACH resource(s) according to Section 5.1.2 of TS 38.321, and (Reference Signal Received Quality (RSRP)) measurement value(s) of Synchronization Signal/Physical Broadcast Channel (SS/PBCH) block(s) or Channel State Information-Reference Signal (CSI-RS) resource(s) associated with the current serving beam(s) is above the configured threshold value; a physical layer of the UE does not indicate beam failure detection to a higher layer for a certain time period; and/or the UE successfully receives PDCCH in previously configured Control Resource Set(s) (CORESET(s)) associated with the current serving beam(s).

According to another possible embodiment, after a UE initiates BFR, a target Block Error Rate (BLER) for beam failure detection can be set to be lower than the case that UE does not perform BFR procedure. For example, with on-going BFR procedure, the UE can declare beam failure detection if the assessed hypothetical BLERs for all serving beams are above 5% BLER, while without on-going BFR procedure, UE can declare beam failure detection if the assessed hypothetical BLERs for all serving beams are above 10% BLER.

At least some embodiments can provide for resource allocation and scheduling in high frequency bands, such as millimeter wave bands. For example, in high frequency bands, such as frequency region 2 of 3GPP TS 38.101-2, analog beamforming and a limited number of Radio Frequency (RF) chains at a network entity can limit the number of UEs multiplexed in the frequency domain within a given OFDM symbol. To elaborate, the entire or significant portion of a channel bandwidth can be assigned to one or a few UEs, and non-slot based PUSCH/PDSCH transmission can allow multiplexing of different UEs in the time domain, such as by assigning different sets of symbols within a slot to different UEs. According to 3GPP TS38.214, Resource Allocation (RA) type 0 is Resource Block Group (RBG)-based bitmap with RBG granularity. RA type 1 is Resource Indication Value (RIV) based contiguous Virtual Resource Block (VRB) allocation with Resource Block (RB) granularity (except for some special cases when DCI format 1_0 is monitored in UE-specific Search Space).

According to a possible embodiment, to restrict PDSCH (or PUSCH) frequency resource allocation to bandwidths larger than a threshold value, one option can be to configure the UE to assume certain patterns of the RBG bitmap/RIV values are valid with existing DCI formats and use this information to detect inconsistent control information and improve PDCCH decoding performance.

According to another possible embodiment, a network entity can configure a UE with an RBG configuration with larger RBG sizes, where an additional RBG size configuration with larger RBG sizes can be pre-defined. In RA type 1, such as contiguous VRB allocation, the allowed number of RBs and the starting VRB can be multiples of the RBG size. Additional RBG sizes can be specified, such as in, for example, Table 5.1.2.2.1-1.

TABLE 5.1.2.2.1-1

| Bandwidth Part Size | Nominal RBG size P | | |
|---|---|---|---|
| | Configuration 1 | Configuration 2 | Configuration 3 |
| 1-36 | 2 | 4 | 9 |
| 37-72 | 4 | 8 | 18 |
| 73-144 | 8 | 16 | 36 |
| 145-275 | 16 | 16 | 68 |

Figure 2:
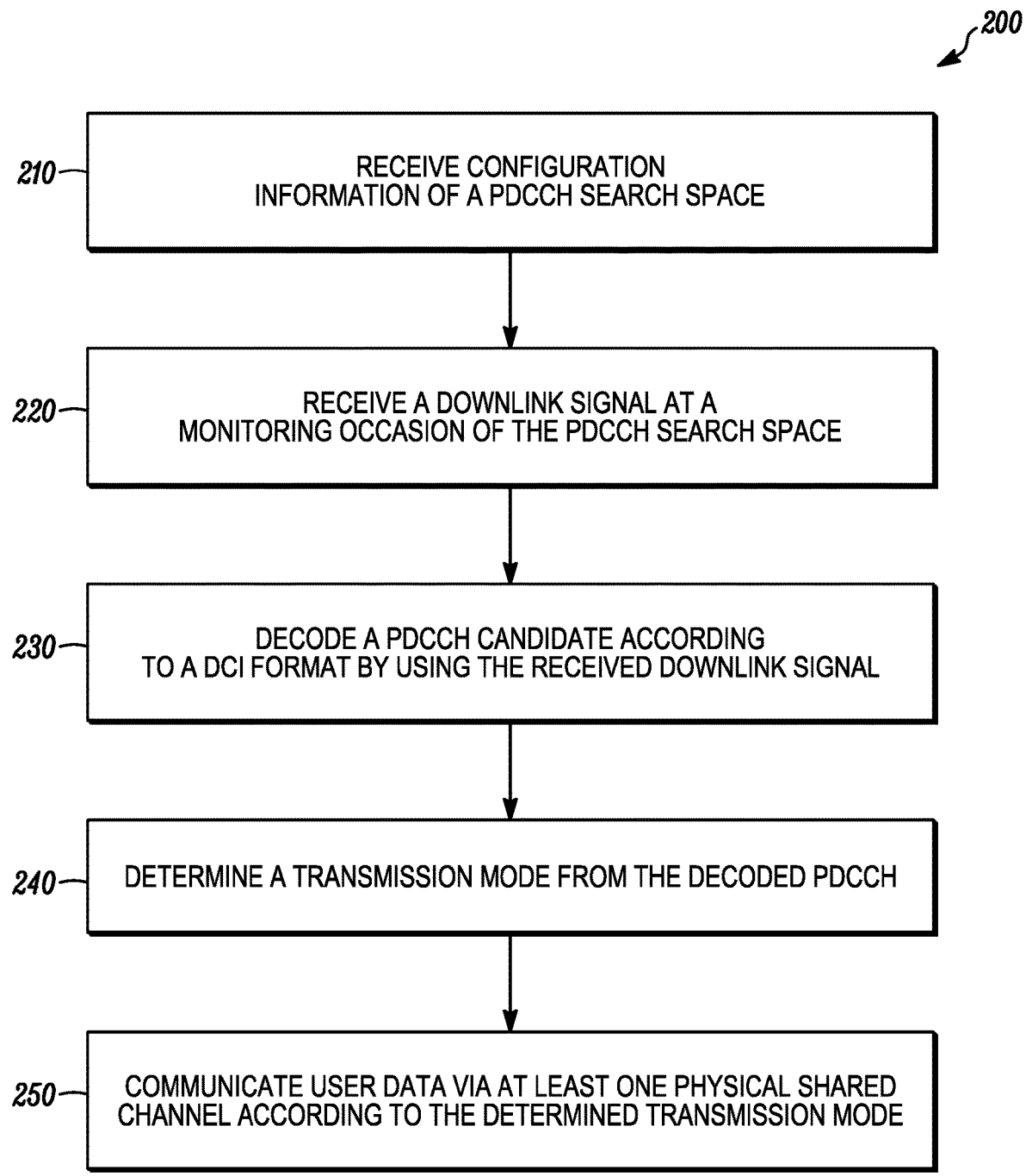
FIG. 2 is an example flowchart illustrating the operation of an apparatus according to a possible embodiment.

FIG. 2 is an example flowchart 200 illustrating the operation of a wireless communication device, such as the UE 110, according to a possible embodiment. At 210, configuration information of a PDCCH search space can be received. The configuration information can identify which DCI format to monitor in the PDCCH search space, as well as other information, such as which aggregation level to monitor, how many candidates to monitor, where the search space is located, and other information. The PDCCH search space can be associated with a DCI format. According to a possible implementation, the DCI format can be a first DCI format and the PDCCH search space may not be associated with a second DCI format that indicates only a single transmission in a physical shared channel.

DCI of the DCI format can dynamically indicate a transmission mode of a plurality of transmission modes. For example, the DCI format can include a bit field indicating the transmission mode. As a further example, the DCI format can include a one-bit transmission mode field, where a value of zero can indicate non-coherent joint transmission for a PUSCH, and a value of one can indicate multiple associated PUSCHs carrying a same TB. If DCI format 0_1A is used only for multiple associated PUSCHs or only for non-coherent joint transmission in a PUSCH, this field may not exist. An SRI can indicate other possible transmission modes. According to a possible implementation, the DCI format can include information of a number of multiple associated physical shared channels and a number of spatial layers for each of the multiple associated physical shared channels. The bit field can be a modified SRI. According to a possible implementation, the DCI format can include information of a number of independently precoded subsets of spatial layers of non-coherent joint transmission in a physical shared channel and a number of spatial layers for each independently precoded subset of spatial layers of the non-coherent joint transmission in the physical shared channel.

The plurality of transmission modes can include at least transmission of multiple associated physical shared channels and can include non-coherent joint transmission in a physical shared channel. A physical shared channel can be a PUSCH, a PDSCH, and/or any other physical shared channel. Transmission of multiple associated physical shared channels can include transmitting a same transport block on each of multiple physical shared channels. Non-coherent joint transmission in a physical shared channel can include transmitting multiple spatial layers in the physical shared channel. The multiple spatial layers can include a plurality of subsets of spatial layers and each of the plurality of subsets of spatial layers can be precoded independently from the other subsets of spatial layers. Multiple codewords can also be transmitted in the physical shared channel. Each codeword of the multiple codewords in the PUSCH can be precoded independently from the other codewords of the multiple codewords in the PUSCH. Each codeword can be associated with a different transport block. For non-coherent joint transmission, it can be assumed that the network does not make use of detailed channel knowledge in the joint transmission.

At 220, a downlink signal can be received at a monitoring occasion of the PDCCH search space. The received downlink signal can be at least one CORESET, such as at least one Control Channel Element (CCE). The PDCCH candidate can be decoded based on a size of the DCI format. The PDCCH candidate can include the received at least one CCE and at least one aggregation level.

At 230, a PDCCH candidate can be decoded according to the DCI format by using the received downlink signal. At 240, a transmission mode can be determined from the decoded PDCCH candidate. According to a possible implementation, the plurality of transmission modes can also include single transmission in a physical shared channel and the transmission mode can be determined to be the single transmission in a physical shared channel based on a number of multiple associated physical shared channels being indicated as one or based on a number of independently precoded subsets of spatial layers of non-coherent joint transmission in a physical shared channel being indicated as one.

At 250, user data can be communicated via at least one physical shared channel according to the determined transmission mode. According to a possible implementation, communicating user data can include transmitting at least one PUSCH. For example, a PUSCH transmission can occur in a transmission occasion. Different PUSCH, and thus, different transmission occasions can be transmitted at different times, can be transmitted in different frequencies, can be transmitted at the same time in the same frequency but in different spatial transmissions, and/or can be otherwise transmitted differently. According to another possible implementation, communicating user data can include receiving at least one PDSCH.

According to possible implementation, at least one PUCCH spatial setting can be received in a PUCCH spatial relation information configuration. A MAC CE can be received that indicates at least one active PUCCH spatial setting selected from the at least one PUCCH spatial setting. A number of active PUCCH spatial settings can be determined based on the received MAC CE. If the transmission mode is transmission of multiple associated PUSCHs, a number of multiple associated PUSCHs can be determined based on the determined number of active PUCCH spatial settings and spatial settings of the multiple associated PUSCHs can be determined based on the active PUCCH spatial settings indicated in the received MAC CE. If the transmission mode is non-coherent joint transmission in a PUSCH, a number of multiple independently precoded subsets of spatial layers of non-coherent joint transmission in a PUSCH can be determined based on the determined number of active PUCCH spatial settings and spatial settings of the multiple independently precoded subsets of spatial layers of non-coherent joint transmission in a PUSCH can be determined based on the active PUCCH spatial settings indicated in the received MAC CE.

According to another possible implementation, a first spatial relation setting for a PUCCH can be received. A second spatial relation setting can also be received. User data can be communicated by transmitting a first transmission corresponding to the determined transmission mode based on the first spatial relation setting and by transmitting a second transmission corresponding to the determined transmission mode based on the second spatial setting. The second spatial relation setting can be a reference spatial relation setting.

According to another possible implementation, a plurality of TCI-state configurations can be received. An indication of a first and second TCI-states can be received in the DCI. User data can be communicated by receiving a first transmission corresponding to the determined transmission mode based on the first TCI-state and by receiving a second transmission corresponding to the determined transmission mode based on the second TCI-state. According to another possible implementation, a MAC CE can be received. The MAC CE can indicate at least one active TCI-state of the plurality of configured TCI-states. The first and second TCI-states can be selected from the at least one active TCI state.

According to a possible example, the multiple associated physical shared channels can be multiple associated PDSCHs, the first transmission can be a first PDSCH of the multiple associated PDSCHs and the second transmission can be a second PDSCH of the multiple associated PDSCHs. According to another possible example, the physical shared channel can be a PDSCH, the first transmission can be a first codeword of the non-coherent joint transmission in the PDSCH, and the second transmission can be a second codeword of the non-coherent joint transmission in the PDSCH. According to another possible example, the physical shared channel can be a PDSCH, the first transmission can be a first set of layers of a codeword of the non-coherent joint transmission in the PDSCH, and the second transmission can be a second set of layers of the codeword of the non-coherent joint transmission in the PDSCH.

According to possible embodiments, multiple associated PUSCH can be multiple associated transmission occasions. For example, a PUSCH can be a transmission occasion. Transmission occasions can be transmitted at different times and/or at the same time and frequency, but on different beams. Data associated with a TB can be transmitted on a PUSCH.

Figure 3:
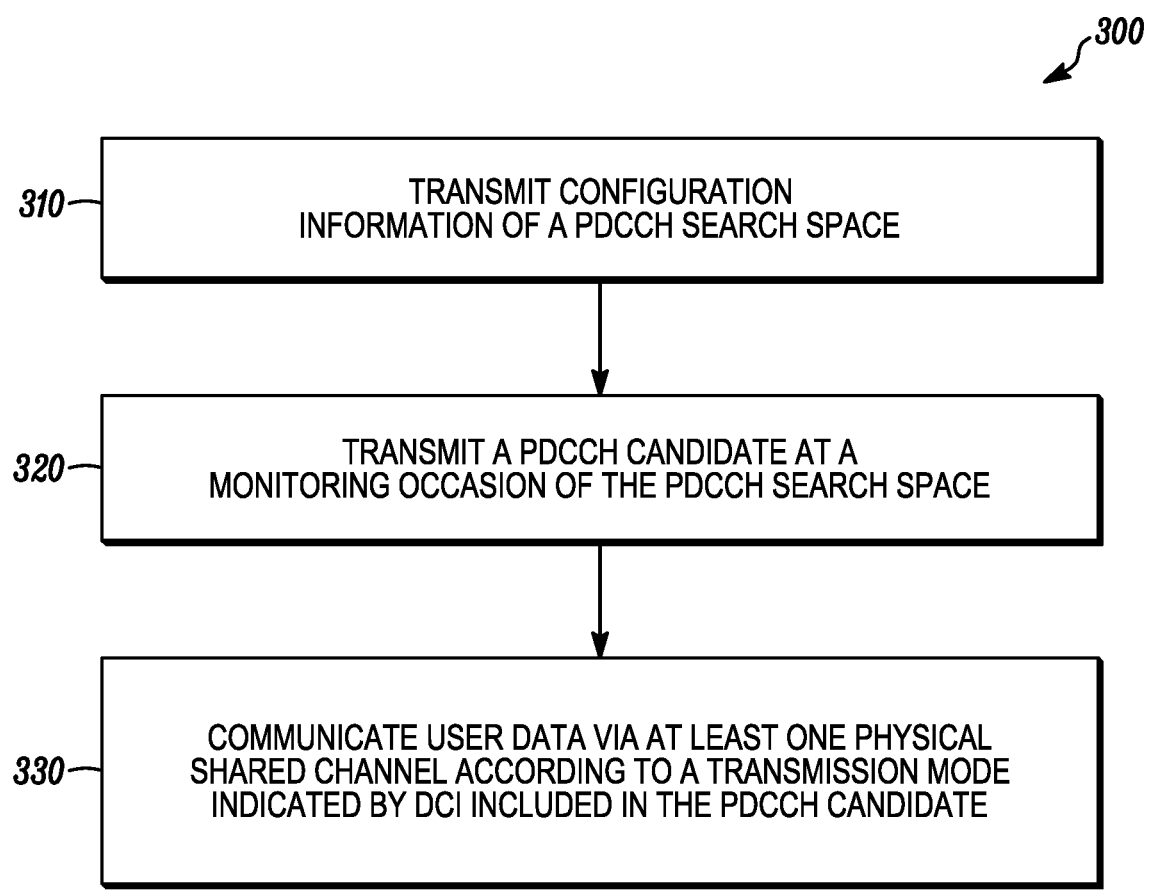
FIG. 3 is an example flowchart illustrating the operation of an apparatus according to a possible embodiment.

FIG. 3 is an example flowchart 300 illustrating the operation of a wireless communication device, such as the network entity 120, according to a possible embodiment. At 310, configuration information of a PDCCH search space can be transmitted. The PDCCH search space can be associated with a DCI format. DCI of the DCI format can dynamically indicate a transmission mode of a plurality of transmission modes. The plurality of transmission modes can include at least transmission of multiple associated physical shared channels and non-coherent joint transmission in a physical shared channel. At 320, a PDCCH candidate can be transmitted at a monitoring occasion of the PDCCH search space. The PDCCH candidate can include the DCI. At 330, user data can be communicated via at least one physical shared channel according to the transmission mode indicated by the DCI included in the PDCCH candidate. According to other possible implementations, other signals can be transmitted to and received from a UE as described in other embodiments and the signals can be otherwise processed.

According to a possible embodiment, the DCI format can include a bit field indicating the transmission mode. According to a possible embodiment, transmission of multiple associated physical shared channels can include transmission of a same transport block on each of multiple physical shared channels. According to a possible embodiment, non-coherent joint transmission in a physical shared channel can include transmission of multiple spatial layers in the physical shared channel. The multiple spatial layers can include a plurality of subsets of spatial layers and each of the plurality of subsets of spatial layers is precoded independently from the other subsets of spatial layers. According to a possible embodiment, the DCI format can be a first DCI format and the PDCCH search space may not be associated with a second DCI format that indicates only a single transmission in a physical shared channel. According to a possible embodiment, the DCI format can include information of a number of multiple associated physical shared channels and a number of spatial layers for each of the multiple associated physical shared channels.

According to a possible embodiment, the plurality of transmission modes can include single transmission in a physical shared channel. According to a possible implementation, the transmission mode can be determined to be the single transmission in a physical shared channel based on a number of multiple associated physical shared channels being indicated as one or based on a number of independently precoded subsets of spatial layers of non-coherent joint transmission in a physical shared channel being indicated as one.

According to a possible embodiment, the DCI format can include information of a number of independently precoded subsets of spatial layers of non-coherent joint transmission in a physical shared channel and a number of spatial layers for each independently precoded subset of spatial layers of the non-coherent joint transmission in the physical shared channel.

According to a possible embodiment, at least one PUCCH spatial setting can be transmitted in a PUCCH spatial relation information configuration and a MAC CE can be transmitted that indicates at least one active PUCCH spatial setting selected from the at least one PUCCH spatial setting. A number of active PUCCH spatial settings for a serving cell of a UE can be based on the transmitted MAC CE. If the transmission mode is transmission of multiple associated PUSCHs, a number of multiple associated PUSCHs can be based on the number of active PUCCH spatial settings, and spatial settings of the multiple associated PUSCHs can be based on the active PUCCH spatial settings indicated in the transmitted MAC CE. If the transmission mode is non-coherent joint transmission in a PUSCH, a number of independently precoded subsets of spatial layers of non-coherent joint transmission in a PUSCH can be based on the number of active PUCCH spatial settings, and spatial settings of the independently precoded subsets of spatial layers of non-coherent joint transmission in a PUSCH can be based on the active PUCCH spatial settings indicated in the transmitted MAC CE.

According to a possible embodiment, a first spatial relation setting for a PUCCH and a second spatial relation setting can be transmitted. The second spatial relation setting can be a reference spatial relation setting. Communicating can include receiving a first transmission corresponding to the determined transmission mode based on the first spatial relation setting and receiving a second transmission corresponding to the determined transmission mode based on the second spatial setting.

According to a possible embodiment, a plurality of Transmission Configuration Indication (TCI)-state configurations can be transmitted. An indication of first and second TCI-states in the DCI can be transmitted. Communicating can include transmitting a first transmission corresponding to the determined transmission mode based on the first TCI-state and transmitting a second transmission corresponding to the determined transmission mode based on the second TCI-state. According to a possible implementation, the multiple associated physical shared channels can be multiple associated PDSCHs, the first transmission can be a first PDSCH of the multiple associated PDSCHs and the second transmission can be a second PDSCH of the multiple associated PDSCHs. According to a possible implementation, the physical shared channel can be a PDSCH, the first transmission can be a first codeword of the non-coherent joint transmission in the PDSCH, and the second transmission can be a second codeword of the non-coherent joint transmission in the PDSCH. According to a possible implementation, the physical shared channel can be a PDSCH, the first transmission can be a first set of layers of a codeword of the non-coherent joint transmission in the PDSCH, and the second transmission can be a second set of layers of the codeword of the non-coherent joint transmission in the PDSCH.

According to a possible embodiment, a MAC CE can be transmitted that indicates at least one active TCI-state of the plurality of configured TCI-states. The first and second TCI-states can be selected from the at least one active TCI state.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 4:
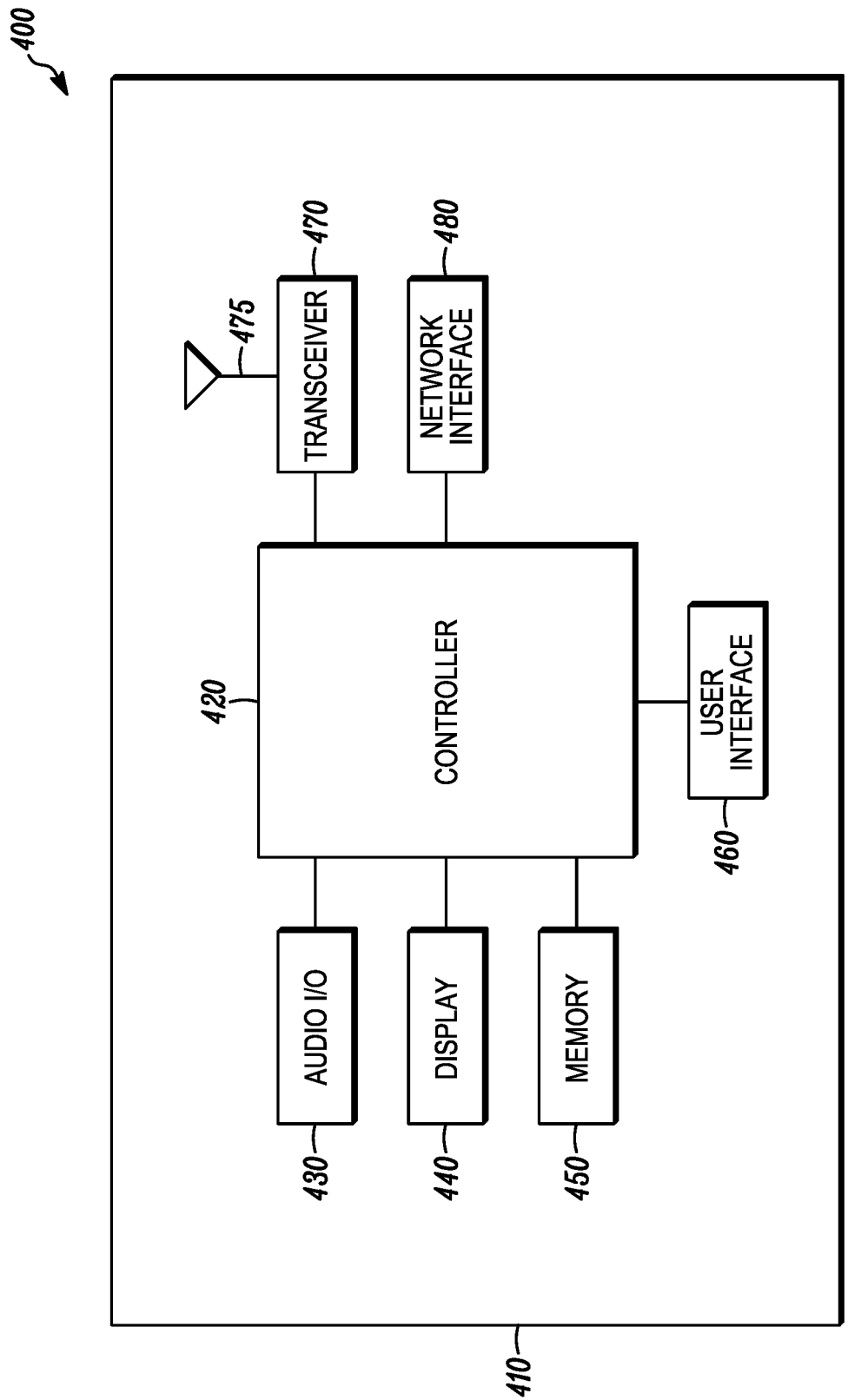
FIG. 4 is an example block diagram of an apparatus according to a possible embodiment.

FIG. 4 is an example block diagram of an apparatus 400, such as the UE 110, the network entity 120, or any other wireless communication device disclosed herein, according to a possible embodiment. The apparatus 400 can include a housing 410, a controller 420 coupled to the housing 410, audio input and output circuitry 430 coupled to the controller 420, a display 440 coupled to the controller 420, a memory 450 coupled to the controller 420, a user interface 460 coupled to the controller 420, a transceiver 470 coupled to the controller 420, at least one antenna 475 coupled to the transceiver 470, and a network interface 480 coupled to the controller 420. The apparatus 400 may not necessarily include all of the illustrated elements for different embodiments of the present disclosure. The apparatus 400 can perform the methods described in all the embodiments.

The display 440 can be a viewfinder, a Liquid Crystal Display (LCD), a Light Emitting Diode (LED) display, an Organic Light Emitting Diode (OLED) display, a plasma display, a projection display, a touch screen, or any other device that displays information. The transceiver 470 can be one or more transceivers that can include a transmitter and/or a receiver. The audio input and output circuitry 430 can include a microphone, a speaker, a transducer, or any other audio input and output circuitry. The user interface 460 can include a keypad, a keyboard, buttons, a touch pad, a joystick, a touch screen display, another additional display, or any other device useful for providing an interface between a user and an electronic device. The network interface 480 can be a Universal Serial Bus (USB) port, an Ethernet port, an infrared transmitter/receiver, an IEEE 1394 port, a wireless transceiver, a WLAN transceiver, or any other interface that can connect an apparatus to a network, device, and/or computer and that can transmit and receive data communication signals. The memory 450 can include a Random-Access Memory (RAM), a Read Only Memory (RON), an optical memory, a solid-state memory, a flash memory, a removable memory, a hard drive, a cache, or any other memory that can be coupled to an apparatus.

The apparatus 400 or the controller 420 may implement any operating system, such as Microsoft Windows®, UNIX®, LINUX®, Android™, or any other operating system. Apparatus operation software may be written in any programming language, such as C, C++, Java, or Visual Basic, for example. Apparatus software may also run on an application framework, such as, for example, a Java® framework, a .NET® framework, or any other application framework. The software and/or the operating system may be stored in the memory 450, elsewhere on the apparatus 400, in cloud storage, and/or anywhere else that can store software and/or an operating system. The apparatus 400 or the controller 420 may also use hardware to implement disclosed operations. For example, the controller 420 may be any programmable processor. Furthermore, the controller 420 may perform some or all of the disclosed operations. For example, some operations can be performed using cloud computing and the controller 420 may perform other operations. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 420 may be any controller or processor device or devices capable of operating an apparatus and implementing the disclosed embodiments. Some or all of the additional elements of the apparatus 400 can also perform some or all of the operations of the disclosed embodiments.

In operation, the apparatus 400 can perform the methods and operations of the disclosed embodiments. The transceiver 470 can transmit and receive signals, including control signals and data signals and including information, such as control and data information. The controller 420 can generate and process the transmitted and received signals and information.

According to a possible embodiment in operations as a UE, the transceiver 470 can receive configuration information of a PDCCH search space. The PDCCH search space can be associated with a DCI format. DCI of the DCI format can dynamically indicate a transmission mode of a plurality of transmission modes. The plurality of transmission modes can include at least transmission of multiple associated physical shared channels and non-coherent joint transmission in a physical shared channel. The transceiver 470 can receive a downlink signal at a monitoring occasion of the PDCCH search space. The controller 420 can decode a PDCCH candidate according to the DCI format by using the received downlink signal. The controller 420 can determine a transmission mode from the decoded PDCCH candidate. The transceiver 470 can communicate user data via at least one physical shared channel according to the determined transmission mode.

According to a possible implementation, the transceiver 470 can receive a first spatial relation setting for a PUCCH. The transceiver 470 can receive a second spatial relation setting. The transceiver 470 can communicate user data by transmitting a first transmission corresponding to the determined transmission mode based on the first spatial relation setting and by transmitting a second transmission corresponding to the determined transmission mode based on the second spatial setting. The second spatial relation setting can be a reference spatial relation setting.

According to a possible implementation, the transceiver 470 can receive a plurality of TCI-state configurations. The transceiver 470 can receive an indication of a first and second TCI-states in the DCI. The transceiver 470 can communicate user data by receiving a first transmission corresponding to the determined transmission mode based on the first TCI-state and by receiving a second transmission corresponding to the determined transmission mode based on the second TCI-state.

According to a possible implementation, the transceiver 470 can receive a MAC CE that indicates at least one active TCI-state of the plurality of configured TCI-states. The first and second TCI-states can be selected from the at least one active TCI state.

In operation as a network entity according to a possible embodiment, the controller 420 can generate and process signals and otherwise control operations of the apparatus 400. The transceiver 470 can transmit configuration information of a PDCCH search space. The PDCCH search space can be associated with a DCI format. DCI of the DCI format can dynamically indicate a transmission mode of a plurality of transmission modes. The plurality of transmission modes can include at least transmission of multiple associated physical shared channels and non-coherent joint transmission in a physical shared channel. The transceiver 470 can transmit a PDCCH candidate at a monitoring occasion of the PDCCH search space. The PDCCH candidate can include the DCI. The transceiver 470 can communicate user data via at least one physical shared channel according to the transmission mode indicated by the DCI included in the PDCCH candidate. The transceiver 470 can also transmit other signals to and receive other signals from a UE and the controller 420 can generate and process signals in accordance with other embodiments.

At least some methods of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

At least some embodiments can improve operation of the disclosed devices. Also, while this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of," "at least one selected from the group of" or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

We claim:

1. A method at a user equipment, the method comprising:
   receiving configuration information of a physical downlink control channel search space,
   where the physical downlink control channel search space is associated with a downlink control information format, where downlink control information of the downlink control information format dynamically indicates a transmission mode of a plurality of transmission modes, and where the plurality of transmission modes include at least transmission of multiple associated physical shared channels and non-coherent joint transmission in a physical shared channel;

receiving a downlink signal at a monitoring occasion of the physical downlink control channel search space;

decoding a physical downlink control channel candidate according to the downlink control information format by using the received downlink signal;

determining a transmission mode from the decoded physical downlink control channel candidate; and communicating user data via at least one physical shared channel according to the determined transmission mode.

2. The method according to claim 1, wherein the downlink control information format includes a bit field indicating the transmission mode.

3. The method according to claim 1, wherein transmission of multiple associated physical shared channels comprises transmitting a same transport block on each of multiple physical shared channels.

4. The method according to claim 1, wherein non-coherent joint transmission in a physical shared channel comprises transmitting multiple spatial layers in the physical shared channel, where the multiple spatial layers comprise a plurality of subsets of spatial layers and each of the plurality of subsets of spatial layers is precoded independently from the other subsets of spatial layers.

5. The method according to claim 1,
wherein the downlink control information format comprises a first downlink control information format, and
wherein the physical downlink control channel search space is not associated with a second downlink control information format that indicates only a single transmission in a physical shared channel.

6. The method according to claim 1, wherein the downlink control information format includes information of a number of multiple associated physical shared channels and a number of spatial layers for each of the multiple associated physical shared channels.

7. The method according to claim 1, wherein the plurality of transmission modes include single transmission in a physical shared channel.

8. The method according to claim 7, wherein determining the transmission mode comprises determining the transmission mode to be the single transmission in a physical shared channel based on a number of multiple associated physical shared channels being indicated as one or based on a number of independently precoded subsets of spatial layers of non-coherent joint transmission in a physical shared channel being indicated as one.

9. The method according to claim 1, wherein the downlink control information format includes information of a number of independently precoded subsets of spatial layers of non-coherent joint transmission in a physical shared channel and a number of spatial layers for each independently precoded subset of spatial layers of the non-coherent joint transmission in the physical shared channel.

10. The method according to claim 1, further comprising:
receiving at least one physical uplink control channel spatial setting in a physical uplink control channel spatial relation information configuration;
receiving a medium access control control element that indicates at least one active physical uplink control channel spatial setting selected from the at least one physical uplink control channel spatial setting;
determining a number of active physical uplink control channel spatial settings based on the received medium access control control element;
if the transmission mode is transmission of multiple associated physical uplink shared channels:
determining a number of multiple associated physical uplink shared channels based on the determined number of active physical uplink control channel spatial settings; and
determining spatial settings of the multiple associated physical uplink shared channels based on the active physical uplink control channel spatial settings indicated in the received medium access control control element; and
if the transmission mode is non-coherent joint transmission in a physical uplink shared channel:
determining a number of independently precoded subsets of spatial layers of non-coherent joint transmission in a physical uplink shared channel based on the determined number of active physical uplink control channel spatial settings; and
determining spatial settings of the independently precoded subsets of spatial layers of non-coherent joint transmission in a physical uplink shared channel based on the active physical uplink control channel spatial settings indicated in the received medium access control control element.

11. The method according to claim 1, further comprising:
receiving a first spatial relation setting for a physical uplink control channel; and
receiving a second spatial relation setting,
wherein communicating comprises:
transmitting a first transmission corresponding to the determined transmission mode based on the first spatial relation setting; and
transmitting a second transmission corresponding to the determined transmission mode based on the second spatial setting, and
wherein the second spatial relation setting is a reference spatial relation setting.

12. The method according to claim 1, further comprising:
receiving a plurality of transmission configuration indication-state configurations; and
receiving an indication of a first and second transmission configuration indication-states in the downlink control information,
wherein communicating comprises:
receiving a first transmission corresponding to the determined transmission mode based on the first transmission configuration indication-state; and
receiving a second transmission corresponding to the determined transmission mode based on the second transmission configuration indication-state.

13. The method according to claim 12,
wherein the multiple associated physical shared channels are multiple associated physical downlink shared channels;
wherein the first transmission is a first physical downlink shared channel of the multiple associated physical downlink shared channels, and wherein the second transmission is a second physical downlink shared channel of the multiple associated physical downlink shared channels.

14. The method according to claim 12,
wherein the physical shared channel is a physical downlink shared channel;
wherein the first transmission is a first codeword of the non-coherent joint transmission in the physical downlink shared channel, and
wherein the second transmission is a second codeword of the non-coherent joint transmission in the physical downlink shared channel.

15. The method according to claim 12,
wherein the physical shared channel is a physical downlink shared channel;
wherein the first transmission is a first set of layers of a codeword of the non-coherent joint transmission in the physical downlink shared channel, and
wherein the second transmission is a second set of layers of the codeword of the non-coherent joint transmission in the physical downlink shared channel.

16. The method according to claim 12, further comprising receiving a medium access control control element that indicates at least one active transmission configuration indication-state of the plurality of configured transmission configuration indication-states,
wherein the first and second transmission configuration indication-states are selected from the at least one active transmission configuration indication state.

17. An apparatus comprising:
a transceiver that
receives configuration information of a physical downlink control channel search space,
where the physical downlink control channel search space is associated with a downlink control information format,
where downlink control information of the downlink control information format dynamically indicates a transmission mode of a plurality of transmission modes, and
where the plurality of transmission modes include at least transmission of multiple associated physical shared channels and non-coherent joint transmission in a physical shared channel, and
receives a downlink signal at a monitoring occasion of the physical downlink control channel search space; and
a controller coupled to the transceiver, where the controller
decodes a physical downlink control channel candidate according to the downlink control information format by using the received downlink signal, and
determines a transmission mode from the decoded physical downlink control channel candidate,
wherein the transceiver communicates user data via at least one physical shared channel according to the determined transmission mode.

18. The apparatus according to claim 17,
wherein the transceiver
receives a first spatial relation setting for a physical uplink control channel,
receives a second spatial relation setting, and
communicates user data by transmitting a first transmission corresponding to the determined transmission mode based on the first spatial relation setting and transmitting a second transmission corresponding to the determined transmission mode based on the second spatial setting, and
wherein the second spatial relation setting is a reference spatial relation setting.

19. The apparatus according to claim 17, wherein the transceiver
receives a plurality of transmission configuration indication-state configurations,
receives an indication of a first and second transmission configuration indication-states in the downlink control information, and
communicates user data by receiving a first transmission corresponding to the determined transmission mode based on the first transmission configuration indication-state and receiving a second transmission corresponding to the determined transmission mode based on the second transmission configuration indication-state.

20. The apparatus according to claim 17,
wherein the transceiver receives a medium access control control element that indicates at least one active transmission configuration indication-state of the plurality of configured transmission configuration indication-states, and
wherein the first and second transmission configuration indication-states are selected from the at least one active transmission configuration indication state.

\* \* \* \* \*